(12) United States Patent
Wang et al.

(10) Patent No.: US 12,410,039 B2
(45) Date of Patent: Sep. 9, 2025

(54) MULTI-TOWER LINKAGE TYPE AERIAL HOISTING PLATFORM

(71) Applicant: WUHAN CONSTRUCTION ENGINEERING GROUP CO., LTD., Wuhan (CN)

(72) Inventors: Shuai Wang, Wuhan (CN); Wenxiang Li, Wuhan (CN); Ming You, Wuhan (CN); Mingzhao Wang, Wuhan (CN); Tong Lu, Wuhan (CN); Zhendong Du, Wuhan (CN); Zongyou Hu, Wuhan (CN); Wenhui Xiong, Wuhan (CN); Chen Liu, Wuhan (CN); Chen Qian, Wuhan (CN); Yunjie Dong, Wuhan (CN); Keyang Wu, Wuhan (CN); Li Wang, Wuhan (CN); Wei Yang, Wuhan (CN); Jun He, Wuhan (CN); Yangjun Xu, Wuhan (CN); Yuanbang Ge, Wuhan (CN); Xiaolong Yang, Wuhan (CN)

(73) Assignee: WUHAN CONSTRUCTION ENGINEERING GROUP CO., LTD., Wuhan (CN)

( * ) Notice: Subject to any disclaimer, the term of this patent is extended or adjusted under 35 U.S.C. 154(b) by 0 days.

(21) Appl. No.: 18/864,015

(22) PCT Filed: May 5, 2023

(86) PCT No.: PCT/CN2023/092201
§ 371 (c)(1),
(2) Date: Nov. 8, 2024

(87) PCT Pub. No.: WO2023/216978
PCT Pub. Date: Nov. 16, 2023

(65) Prior Publication Data
US 2025/0162845 A1 May 22, 2025

(30) Foreign Application Priority Data

May 9, 2022 (CN) .......................... 202210500957.7

(51) Int. Cl.
*B66C 17/06* (2006.01)
*B66C 6/00* (2006.01)
(Continued)

(52) U.S. Cl.
CPC ................ *B66C 17/06* (2013.01); *B66C 6/00* (2013.01); *B66C 7/08* (2013.01); *B66C 9/10* (2013.01)

(58) Field of Classification Search
CPC ......... B66C 17/00; B66C 17/06; B66C 17/26; B66C 6/00; B66C 7/00; B66C 7/08; B66C 9/00; B66C 9/10
See application file for complete search history.

(56) References Cited

U.S. PATENT DOCUMENTS

| | | | | |
|---|---|---|---|---|
| 8,037,658 B2 * | 10/2011 | Kundel, Sr. | ............. | B66C 17/00 52/654.1 |
| 8,156,707 B2 * | 4/2012 | Kundel, Sr. | ............... | E04C 3/30 52/843 |

(Continued)

FOREIGN PATENT DOCUMENTS

| CN | 102133907 A | 7/2011 |
|---|---|---|
| CN | 202089710 U | 12/2011 |

(Continued)

OTHER PUBLICATIONS

CN 114873488 A Machine Translation (Year: 2022).*

*Primary Examiner* — Anna M Momper
*Assistant Examiner* — Juan J Campos, Jr.
(74) *Attorney, Agent, or Firm* — Bayramoglu Law Offices LLC

(57) ABSTRACT

A multi-tower linkage type aerial hoisting platform includes: four tower crane body lifting/lowering parts respectively
(Continued)

disposed in an outer periphery of a building to form a rectangle through enclosure, and including a tower crane body and a self-climbing lifting/lowering system that is capable of climbing or descending step by step along the tower crane body; four tower-crane-body-connected support beams, respectively disposed on two opposite self-climbing lifting/lowering systems, where a hoisting platform enclosed by the tower-crane-body-connected support beams is driven by the self-climbing lifting/lowering systems to move up and down synchronously; and four movable tower crane bases, respectively disposed at lower ends of the four tower crane body lifting/lowering parts, including movable chassis that are used as movable supports with a variable platform angle and support parts disposed on the movable chassis, where four corners of the support parts are respectively provided with rotary drilling fastening parts.

7 Claims, 23 Drawing Sheets

(51) Int. Cl.
    *B66C 7/08*          (2006.01)
    *B66C 9/10*          (2006.01)

(56) References Cited

U.S. PATENT DOCUMENTS

| | | | |
|---|---|---|---|
| 12,209,422 B2* | 1/2025 | Bramberger | B66C 23/283 |
| 2010/0170865 A1* | 7/2010 | Kundel, Sr. | B66C 7/08 |
| | | | 212/175 |
| 2012/0005980 A1* | 1/2012 | Kundel, Sr. | E04C 3/083 |
| | | | 52/655.1 |
| 2022/0032500 A1* | 2/2022 | Bramberger | B66C 13/48 |

FOREIGN PATENT DOCUMENTS

| | | |
|---|---|---|
| CN | 108975186 A | 12/2018 |
| CN | 109129819 A | 1/2019 |
| CN | 111320084 A | 6/2020 |
| CN | 212582721 U | 2/2021 |
| CN | 112938774 A | 6/2021 |
| CN | 113073839 A | 7/2021 |
| CN | 113874314 A | 12/2021 |
| CN | 114873488 A | 8/2022 |
| JP | H1081267 A | 3/1998 |
| KR | 102045221 B1 | 11/2019 |

* cited by examiner

MULTI-TOWER LINKAGE TYPE AERIAL HOISTING PLATFORM

CROSS REFERENCE TO THE RELATED APPLICATIONS

This application is the national phase entry of International Application No. PCT/CN2023/092201, filed on May 5, 2023, which is based upon and claims priority to Chinese Patent Application No. 202210500957.7, filed on May 9, 2022, the entire contents of which are incorporated herein by reference.

TECHNICAL FIELD

The present invention relates to a multi-tower linkage type aerial hoisting platform, which is mainly used in engineering construction and building construction fields.

BACKGROUND

With the rapid development of China's infrastructure facilities, a large quantity of military and civilian buildings such as construction fortifications, houses, and office buildings need to be built quickly. A tower crane is the most commonly used lifting device at a construction site, is used to lift raw materials for construction such as steel bars, wooden battens, concrete, and steel pipes, and is an indispensable device at the construction site. A conventional tower crane has a limited hoisting capacity when a lifting distance is long due to arm balancing. With the continuous improvement of China's economic level, the idea of green construction is ingrained in people's minds. People have put forward higher requirements for the construction quality and construction speed of buildings. Especially with the gradual development of prefabricated housing, a plurality of walls and members are completed in factories, and installed at construction sites. These prefabricated wall components have great weight. Traditional tower cranes are increasingly unable to handle these lifting and installation operations, and cannot meet construction needs well. Therefore, a hoisting platform with a larger hoisting capacity is required. In addition, a tower crane body of the conventional tower crane plays only a role of supporting and stabilizing a boom, and the tower crane body can also be extended as a support of an elevator, a support column of a construction platform, or the like, to utilize a plurality of functions of the tower crane body, which can greatly improve construction efficiency and can provide a support platform for a future intelligent construction system, which needs to be updated and utilized again.

A traditional tower crane base is integrally poured by reinforced concrete in a soil pit. After the tower crane is dismantled and placed in another position, the poured concrete tower crane base is left underground, which inconveniences engineering maintenance and land reuse, consumes manpower and material resources, delays a project progress, and produces a large amount of construction waste. At present, there are also prefabricated tower base supports, which, however, are not widely used. When a group of construction projects with a large area is implemented, a plurality of tower cranes are usually disposed, which may not entirely cover a construction region. In addition, the construction of large-area group buildings is typically performed in regions and sections. The traditional tower crane bases are immovable, leading to an idle crane or complete removal of the cranes in a place where construction has been completed, resulting in a relatively low utilization rate. What's more, an existing tower crane has only a lifting function. When a material is lifted to a specified height, the material is moved horizontally, but the tower crane cannot provide an effective horizontal thrust or installation platform in a horizontal direction, causing low transportation, installation, and construction efficiency.

SUMMARY

To resolve the above technical problems, the present invention is intended to provide a multi-tower linkage type aerial hoisting platform. In a case that a conventional tower crane works normally, a tower crane body lifting/lowering part is a self-climbing lifting/lowering system fastened to a tower crane body, and can automatically complete lifting/lowering along the tower crane body by using a tower crane body with standard sections as a support and a hydraulic cylinder as a lifting/lowering force, and in combination with a pneumatic locking mechanism. Four tower crane body lifting/lowering parts are firmly placed in a periphery of a building and form a frame of a rectangular hoisting platform through enclosure, and a moving beam connecting mechanism is disposed, so that a primary hoisting beam and an auxiliary hoisting beam can cooperate to move. While a bearing capacity of the primary hoisting beam is increased, free movement of a hoisting trolley on the primary hoisting beam in a construction range is not affected. The hoisting platform enclosed by four support beams has good stability and a strong load capacity, and the four support beams can move vertically or horizontally, so that the hoisting platform can cover a construction area in three dimensions, and various working procedures such as transportation, masonry, and painting operation can be implemented rapidly. In addition, a movable tower crane base platform is provided, so that a traditionally pouring tower crane base is changed into a movable and recyclable tower crane base, which is proper for building a tower crane in medium and high-rise residential buildings. Defects that a traditional tower crane base cannot be relocated are overcome, a lot of construction funds and construction resources are saved, construction waste is reduced, and a construction period is shortened, helping implementation of a project with a short construction period. The device can be used in construction of a base of a freight elevator on a construction site. A reliable and stable bearing platform is built rapidly in different terrain positions, and a steel plate on the support is provided with a variety of expandable installing holes, which can be expanded into medium-sized anchor point supports for building steel cables, and be used for span transportation through the steel cables.

To further achieve the foregoing purpose, the following technical solutions are used in the present invention.

a multi-tower linkage type aerial hoisting platform, including:
   four tower crane body lifting/lowering parts respectively disposed in an outer periphery of a building to form a rectangle through enclosure, and including a tower crane body and a self-climbing lifting/lowering system that is capable of climbing or descending step by step along the tower crane body;
   four tower-crane-body-connected support beams, respectively disposed on two opposite self-climbing lifting/lowering systems, where a hoisting platform enclosed by the tower-crane-body-connected support beams is driven by the self-climbing lifting/lowering systems to move up and down synchronously; and auxiliary moving beams, slidably disposed below two opposite tower-crane-body-connected support beams;

primary moving beams, located below the auxiliary moving beams and relatively perpendicular to the auxiliary moving beams, and slidably disposed below other two opposite tower-crane-body-connected support beams, where two ends thereof extend out of a frame enclosed by the four tower-crane-body-connected support beams, and lower ends thereof are slidably provided with hoisting trolleys; and four movable tower crane bases, respectively disposed at lower ends of the four tower crane body lifting/lowering parts, including movable chassis that are used as movable supports with a variable platform angle and support parts disposed on the movable chassis, where four corners of the support parts are respectively provided with rotary drilling fastening parts.

Optionally, the self-climbing lifting/lowering system includes a plurality of I-beam standard supports that are spliced and installed along a side surface of the tower crane body and a locking system a and a climbing system disposed on the I-beam standard supports, two I-beams a are connected through a square steel a and a square steel b, and a formed I-beam track matches four I-beam pulleys b provided for the climbing system;

a lower part of a steel plate is connected to the I-beam a, and an upper part of the steel plate is connected to the locking system a; and the steel plate is provided with a plurality of hinged bases, and three hinged bases located at the lower part are configured to hinge and fasten standard sections at an end of the support beam.

Further, the locking system a includes a locking system support, the locking system support is a square frame welded by a high-strength steel, the four I-beam pulleys a are disposed at four corner sides of the locking system support, and the four I-beam pulleys a match an I-beam track of the I-beam standard support;

four support bearings are disposed at the bottoms of the four corners of the locking system support and are configured to support and restrain a rotating shaft a and a rotating shaft b;

two ends of the rotating shaft a and two ends of the rotating shaft b are respectively connected to the four support bearings, and two ends inward are connected to a locking push rod a and a locking push rod b respectively, irregular parts provided for two ends of the locking push rod a and the locking push rod b are respectively provided with openings, and the openings are used for clamping cross beams between the I-beam standard supports; and a middle of the rotating shaft a is provided with two connecting rods, the two connecting rods are connected to heads of two short hydraulic cylinder Y-shaped joints, tails of the two short hydraulic cylinder Y-shaped joints are connected to heads of telescopic rods of two short hydraulic cylinders, and the tails of the short hydraulic cylinders are hinged with cross beams of the locking system support through a short hydraulic cylinder hinged base.

Further, the climbing system includes a locking system b with a structure similar to a structure of the locking system a, the four I-beam pulleys b are connected to upper parts of four I-beam pulleys of the locking system b, and the four I-beam pulleys b match the I-beams a and are configured to move along axes of the I-beams a; and two long hydraulic cylinder hinged bases a are disposed on a side surface of the square steel a, long hydraulic cylinder hinged bases b are disposed on a side surface of a support cross beam of the locking system b, cylinder body tails of two long hydraulic cylinders are connected to the two long hydraulic cylinder hinged bases b respectively, heads of telescopic ends of the two long hydraulic cylinders are connected to tails of two long hydraulic cylinder Y-shaped joints respectively, and heads of the two long hydraulic cylinder Y-shaped joints are connected to the long hydraulic cylinder hinged bases a respectively.

Further, a lower end of the tower-crane-body-connected support beam is provided with a sliding trolley;

two ends of the auxiliary moving beam are respectively connected to sliding trolleys provided for lower ends of two opposite tower-crane-body-connected support beams respectively, and the sliding trolleys are configured to drive the auxiliary moving beams to move along axis directions of the tower-crane-body-connected support beams;

two ends of the primary moving beam are respectively connected to sliding trolleys provided for lower ends of two opposite tower-crane-body-connected support beams, and the sliding trolleys are configured to drive the primary moving beams to move along axis directions of the tower-crane-body-connected support beams; and a lower end of the auxiliary moving beam and an upper end of the primary moving beam are connected through a moving beam connecting mechanism.

Optionally, the support part includes two long square steels that are perpendicular to each other, and ends of the long square steels are configured to firmly connect the rotary drilling fastening parts;

upper ends of the two long square steels are provided with four short square steels, and upper parts of the four short square steels are fastened in pairs through square steels to form a square frame, and square steels are disposed at a diagonal position of the square frame for reinforcement; and a steel plate at the top of the support is fastened to a top of the support part through a bolt.

Further, the rotary drilling fastening part includes a rotary drilling support part and a rotary drilling power part disposed on the rotary drilling support part; the rotary drilling support part includes a vertical steel frame, a relatively thin door-shaped frame is provided above the vertical steel frame and is configured to support, stabilize, and guide a spiral bit to move up and down, a relatively thick door-shaped frame is provided below the vertical steel frame and is connected to an end of the long square steel through hinging; an upper end of the vertical steel frame is provided with a pulley;

the rotary drilling power part includes a winch disposed at an upper end of the vertical steel frame, a power transmission box and a guide slider slidably disposed on the vertical steel frame in sequence, and a speed reducer disposed at a lower end of the vertical steel frame, an output end of the speed reducer is connected to a square transmission shaft, and the other end of the square transmission shaft is connected to the upper end of the vertical steel frame; a side surface of the speed reducer is provided with a motor, and an output shaft of the motor is connected to an input shaft of the speed reducer; and the square transmission shaft is sleeved with an inner square hole sprocket;

a middle of the power transmission box is provided with a large hole and a small hole, bearings are installed in the holes, and the inner square hole sprocket is in an interference fit with a bearing in the small hole; and a transmission shaft of the spiral bit is in an interference fit with a bearing in the large hole of the power transmission box; and a steel wire rope of the winch is connected to the guide slider through the pulley, the winch is configured to pull the guide slider to move up and down, and then entrance and exit of the spiral bit are controlled.

Optionally, the movable chassis includes a crawler walking part and a variable angle system, and the crawler walking part includes crawler power systems and a lifting oil cylinder between the crawler power systems; and the variable angle system includes a variable angle system bottom plate disposed at an upper end of the lifting oil cylinder, a plurality of variable angle oil cylinders that are uniformly distributed at an upper end of the variable angle system bottom plate, and a variable angle system bearing steel plate disposed at an upper end of the variable angle oil cylinder, and is located between the plurality of variable angle oil cylinders, and a main bearing oil cylinder is disposed between the variable angle system bottom plate and the variable angle system bearing steel plate.

Optionally, the main bearing oil cylinder includes a main support frame that is centrally disposed on the variable angle system bottom plate, an inclined support plate is provided around an upper part of the main support frame, and a lower end of the inclined support plate is fastened at the center of four sides of the variable angle system bottom plate;

an upper end of the main support frame is provided with an installing hole for installing a main support servo-hydraulic cylinder, a cylinder body of the main support servo-hydraulic cylinder is located inside the main support frame, and a telescopic end of the main support servo-hydraulic cylinder is located above the main support frame; and a head of the telescopic end of the main support servo-hydraulic cylinder is provided with a Y-shaped pin head, and the Y-shaped pin head is fastened at a lower end of the variable angle system bearing steel plate.

Further, a diagonal tensioning support part is disposed between the support part and the rotary drilling fastening part, and the diagonal tensioning support part includes three groups of threaded diagonal tensioning rods; and one end of each of the three groups of threaded diagonal tensioning rods is hinged with an upper part of the support part, where the other ends of two groups of the threaded diagonal tensioning rods on two sides are hinged with a vertical steel frame, and the other end of one group of the threaded diagonal tensioning rods in the middle is hinged with a long square steel.

Compared with the conventional technologies, the present invention has at least the following beneficial effects.

(1) The tower crane body lifting/lowering part of the device is the self-climbing lifting/lowering system fastened to the tower crane body, which makes full use of a tower crane body structure of the tower crane for construction, but does not affect working of an existing tower crane, improving the utilization of resources, and accelerating the construction efficiency. The connecting structure of the device uses existing standard sections of the tower crane in the market, an assembly principle for the standard sections of the tower crane can be used to expand an area of a hoisting region, and the device is designed with an all-steel frame combination, and has good stability, low costs, and strong combination and expansion capacity.

(2) The two locking systems cooperate with the hydraulic lifting/lowering system to automatically lift or lower the hoisting platform, and the hydraulic step-by-step lifting/lowering system has a more stable and reliable structure and has a stronger bearing capacity than the use of a winch to control lifting/lowering of the platform, providing a basic platform for an intelligent construction system.

(3) The disposed moving beam connecting mechanism enables the primary hoisting beam and the auxiliary hoisting beam to cooperate to move. While a bearing capacity of the primary hoisting beam is increased, free movement of a hoisting trolley on the primary hoisting beam in a construction range is not affected. The hoisting platform enclosed by four support beams has good stability and a strong load capacity, covering three-dimensional space in the construction region.

(4) The moving beam connecting mechanism is used to control the auxiliary moving beam to drive the primary moving beam to move along an axis of the primary moving beam. Initially, and two ends of the primary moving beam extend by a distance by using standard sections. After the primary moving beam is moved, one end can extend twice the initial distance. The hoisting trolley can be moved to a place outside a region enclosed by the hoisting platform to perform hoisting, resolving a problem that an engineering vehicle cannot enter a construction region for unloading cargo.

(5) A traditional poured tower crane base cannot be taken out after use, and can only be buried in the ground and invalidated. For the device, the traditional poured tower crane base is replaced by the movable and recyclable tower crane base, which is proper for building a tower crane in the middle and high-rise residential buildings and can be recycled, reducing costs for pouring piles in advance and preventing large-scale damaging to the ground.

(6) An all-steel structure is simple and reliable and is manufactured with low costs. Threaded adjusting legs at the bottom ensure a level of the base, and large-span rotary digging into the ground is performed for fastening, increasing the stability of the base. Each rotary drill works separately, reducing a situation that four rotary drills of the device fail simultaneously and cannot be used.

(7) The device is not only proper for rapidly building middle and high-rise tower crane bases, but also can be used in building a base of a freight elevator on a construction site. A reliable and stable bearing platform is built rapidly in different terrain positions, and a steel plate above the support is provided with a variety of expandable installing holes. The device can also be expanded into a medium-sized anchor point support for building a steel cable and be used for span transportation through a steel cable.

(8) The variable angle moving base can be moved by a short distance with a load, and a hoisting range is wider. A servo oil cylinder variable angle system ensures horizontal stability of the tower crane base, and can still ensure stable construction of the tower crane in complex terrains, slopes, and other environments. Driving state on a slope surface: when driving on a horizontal plane of a slope, the lifting oil cylinders of the front crawler walking part and the rear crawler walking part are lifted by a same height, ensuring an upper variable angle system bearing steel plate keeps horizontal and furthering ensuring the rotary drilling fastening part keeps horizontal. When driving on a slope surface, the lifting oil cylinder of the front crawler walking part is lowered, the lifting oil cylinder of the rear crawler walking part is lifted, and the variable angle system is controlled to adjust an angle, ensuring an upper variable angle system bearing steel plate keeps horizontal and furthering ensuring stability of the entire device when moving on a slope. When walking on a terrain similar to steps, the lifting oil cylinder of the rear crawler walking part can be lifted first, the forward crawler walking part moves forwards and enters a step, the lifting oil cylinder of the rear crawler walking part is lowered, and the rear crawler walking part moves forward into the step, so that the entire device completes step climbing process step by step.

BRIEF DESCRIPTION OF THE DRAWINGS

FIG. 16 is a structural diagram of a sliding trolley a.

Figure 1:
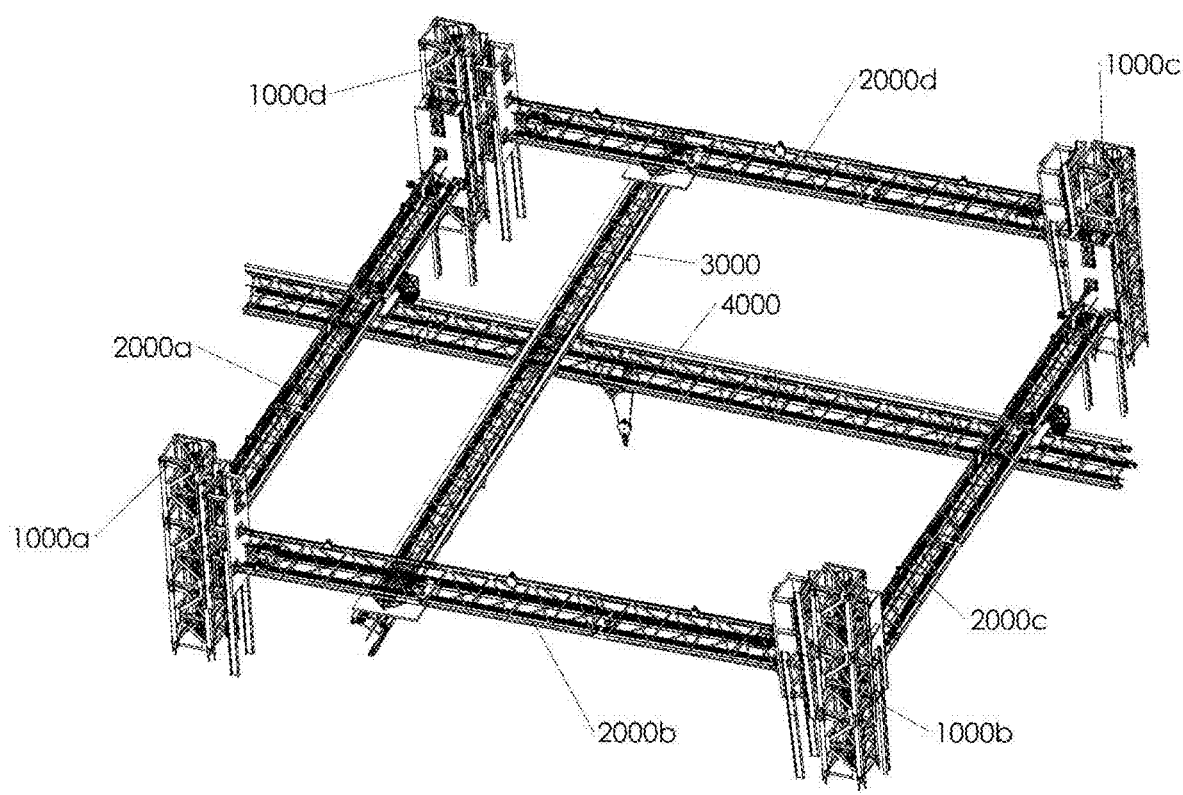
FIG. 1 is an overall axial view of a hoisting platform.
Figure 2:
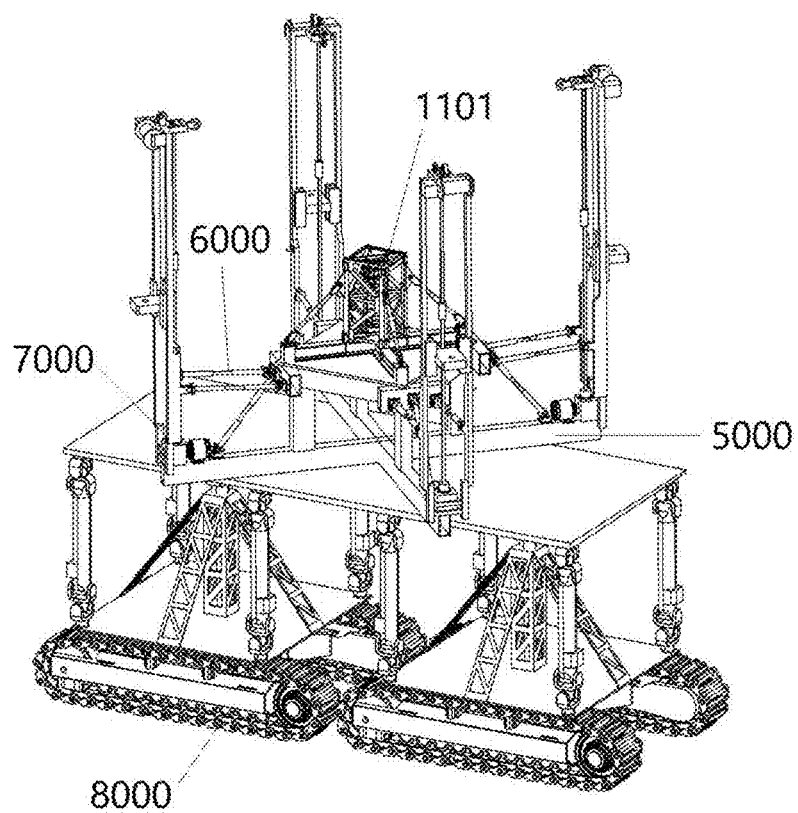
FIG. 2 is a structural diagram of a movable tower crane base.

in the drawings,
1000—tower crane body lifting/lowering part:
1000a—tower crane body lifting/lowering part a, 1000b—tower crane body lifting/lowering part b, 1000c—tower crane body lifting/lowering part c, 1000d—tower crane body lifting/lowering part d;
1100—tower crane body, 1101—tower crane base;
1200—self-climbing lifting/lowering system:
1201—I-beam standard support, 1202—I-beam a, 1203—steel plate, 1204—hinged base;
1210—locking system a;
1211—I-beam pulley a, 1212a—rotating shaft a, 1212b—rotating shaft b, 1213—locking system support, 1214—short hydraulic cylinder Y-shaped joint, 1215—short hydraulic cylinder, 1216a—locking push rod a, 1216b—locking push rod b, 1217—short hydraulic cylinder hinged base, 1218—support bearing;
1220—climbing system:
1221—locking system b, 1222—I-beam pulley b, 1223a—square steel a, 1223b—square steel b, 1224—long hydraulic cylinder hinged base a, 1225—long hydraulic cylinder Y-shaped joint, 1226—long hydraulic cylinder, 1227—long hydraulic cylinder hinged base b;
2000—tower-crane-body-connected support beam:
2000a—tower-crane-body-connected support beam a, 2000b—tower-crane-body-connected support beam b, 2000c—tower-crane-body-connected support beam c, 2000d—tower-crane-body-connected support beam d;
2100—standard section at an end of the support beam;
2101—winch a, 2102—standard section at an end;
2200—standard section in the middle of the support beam;
2300—sliding trolley a;
2301—trolley wheel, 2302—trolley support, 2303—I-beam pulley c;
3000—auxiliary moving beam:
3100—auxiliary moving beam standard section;
3101—steel frame of the auxiliary moving beam standard section, 3102—I-beam b;
3200—moving beam connecting mechanism;
3201—I-beam pulley d, 3202—I-beam pulley e, 3203—two-way oil cylinder installing block, 3204—two-way oil cylinder, 3205—brake block installing plate, 3206—brake block;
3300—sliding trolley b;
4000—primary moving beam:
4100—standard section in the middle of the primary moving beam;
4101—steel frame of the standard section in the middle of the primary moving beam, 4102—I-beam c;

4200—standard section at an end of the primary moving beam;
4201—winch b, 4202—steel frame of the standard section at an end;
4300—hoisting trolley;
4301—hoisting trolley frame, 4302—pulley block, 4303—hook;
5000—support part;
5100—long square steel;
5200—steel plate at the top of the support;
5300—threaded adjusting leg;
6000—diagonal tensioning support part:
6000a—diagonal tensioning support part a, 6000b—diagonal tensioning support part b, 6000c—diagonal tensioning support part c, 6000d—diagonal tensioning support part d;
6100—short square steel;
6200—double-ear-shaped hinged support base;
6200a—double-ear-shaped hinged support base a, 6200b—double-ear-shaped hinged support base b, 6200c—double-ear-shaped hinged support base c, 6200d—double-ear-shaped hinged support base d;
6300—threaded diagonal tensioning rod;
6300a—threaded diagonal tensioning rod a, 6300b—threaded diagonal tensioning rod b, 6300c—threaded diagonal tensioning rod c, 6300d—threaded diagonal tensioning rod d;
6301a—single-ear-shaped hinged base a, 6301b—single-ear-shaped hinged base b, 6302a—internal threaded sleeve a, 6302b—internal threaded sleeve b, 6303—external threaded rod;
7000—rotary drilling fastening part:
7000a—rotary drilling fastening part a, 7000b—rotary drilling fastening part b, 7000c—rotary drilling fastening part c, 7000d—rotary drilling fastening part d;
7100—rotary drilling support part;
7101—vertical steel frame, 7102a—double-ear-shaped pin base a, 7102b—double-ear-shaped pin base b, 7103—pulley;
7200—rotary drilling power part;
7201—speed reducer, 7202—square transmission shaft, 7203—inner square hole sprocket, 7204—motor, 7205—spiral bit, 7206—guide slider, 7207—power transmission box, 7208—winch;
1101—conventional tower crane base:
8000—movable chassis with a variable platform angle:
8100—crawler walking part;
8101—crawler power system, 8102—lifting oil cylinder;
8200—variable angle system;
8210—variable angle oil cylinder;
8211a—Y-shaped pin head a, 8211b—Y-shaped pin head b, 8211c—Y-shaped pin head c, 8211d—Y-shaped pin head d, 8212—variable angle servo-hydraulic cylinder;
8220—main bearing oil cylinder;
8221—inclined support plate, 8222—main support frame, 8223—Y-shaped pin head e, 8224—Y-shaped pin head f, 8225—main support servo-hydraulic cylinder;
8231—variable angle system bottom plate, 8232—variable angle system bearing steel plate;
9000—slope surface.

DETAILED DESCRIPTION OF THE EMBODIMENTS

To facilitate a person skilled in the art to understand and implement the present invention, the present invention is described in further detail below in combination with accompanying drawings and embodiments. It should be understood that the embodiments described herein are only used to illustrate and explain the present invention and are not used to limit the present invention.

Figure 3:
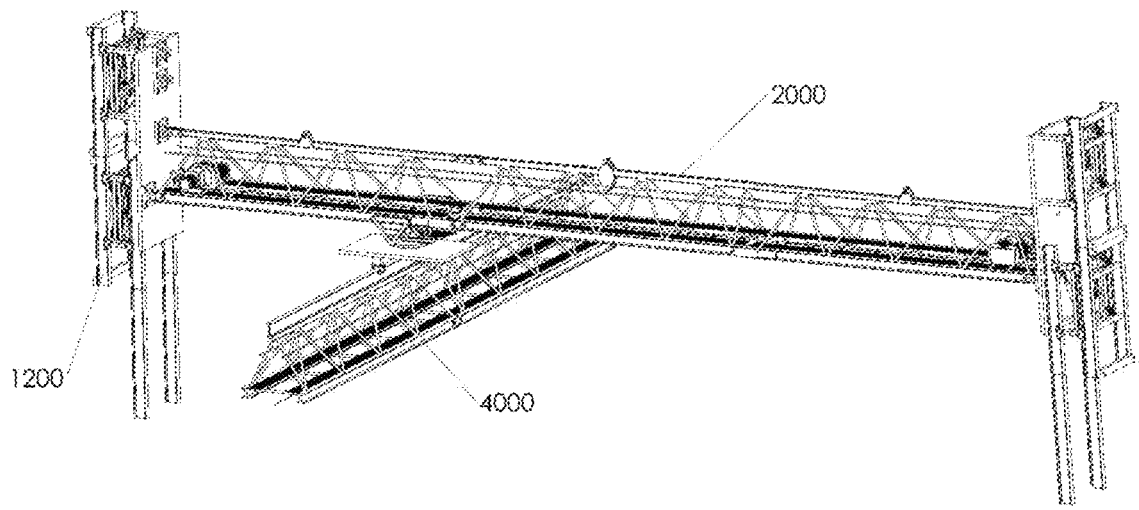
FIG. 3 is a structural diagram of connection between tower-crane-body-connected support beams.
Figure 4:
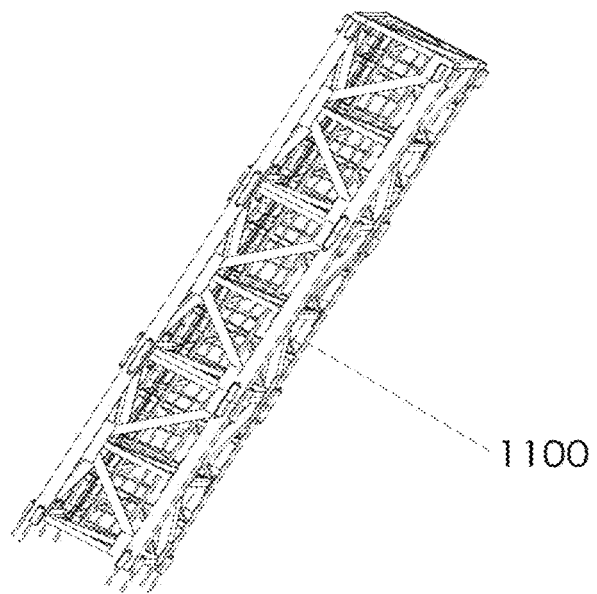
FIG. 4 is a structural diagram of a tower crane body.
Figure 5:
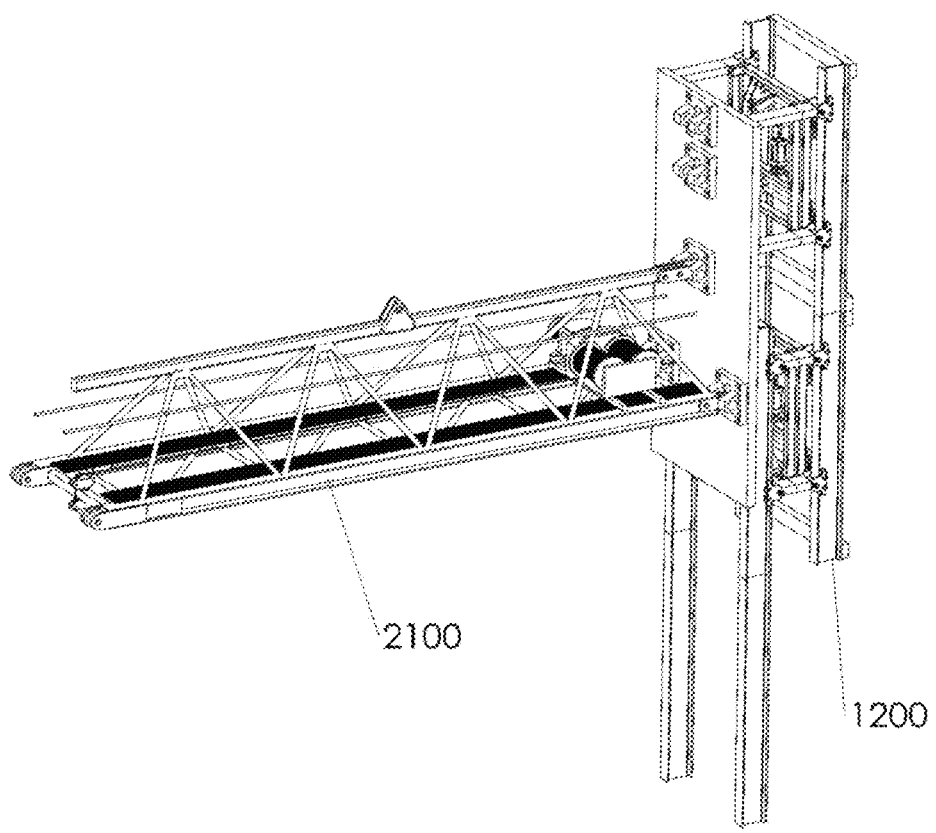
FIG. 5 is a structural diagram of connection between standard sections at an end of the support beam.
Figure 6:
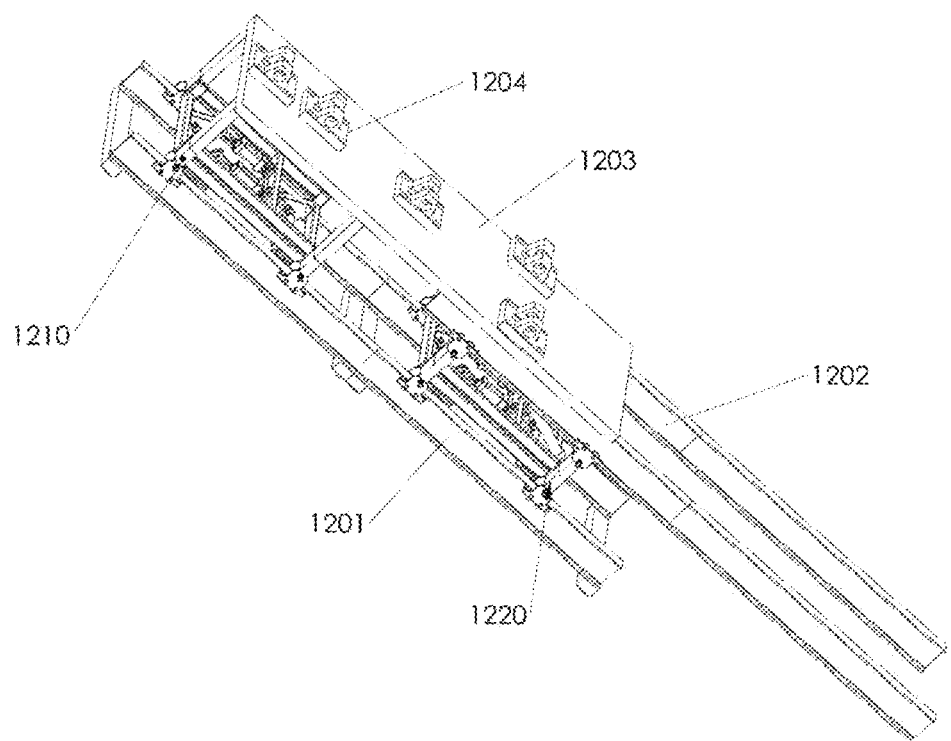
FIG. 6 is a structural diagram of a self-climbing lifting/lowering system.
Figure 7:
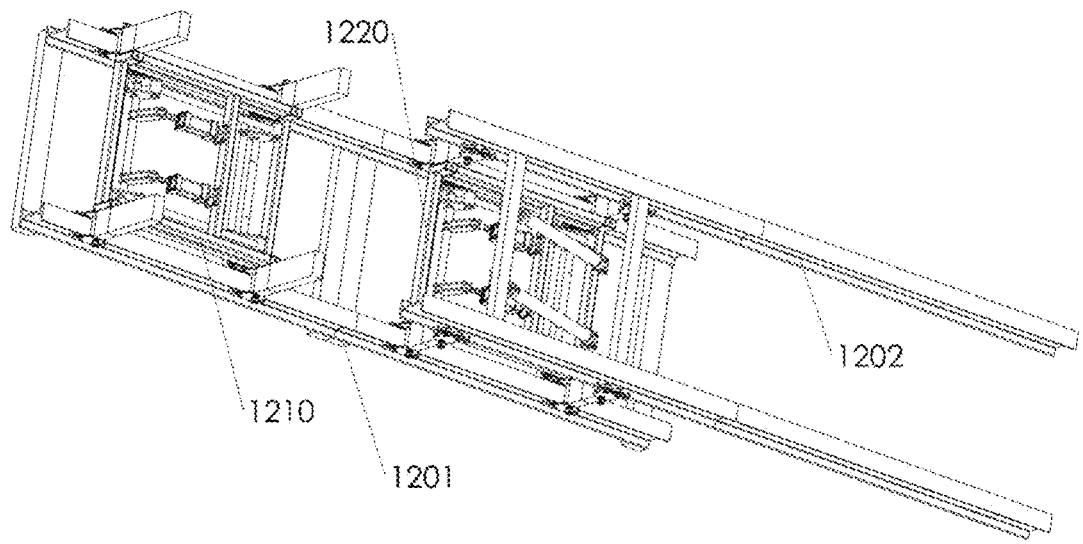
FIG. 7 is an internal detail drawing of the self-climbing lifting/lowering system.

A multi-tower linkage type aerial hoisting platform provided in the present invention is shown in FIG. 1 to FIG. 41. A tower crane body lifting/lowering part 1000 is a self-climbing lifting/lowering system fastened to a tower crane body, and can automatically complete lifting/lowering along the tower crane body by using a tower crane body with standard sections as a support and a hydraulic cylinder as a lifting/lowering force, and in combination with a pneumatic locking mechanism. Four tower crane body lifting/lowering parts 1000a, 1000b, 1000c, 1000d are firmly placed in a periphery of a building, form a rectangle by enclosure, and an automatic climbing mechanism thereof can drive a hoisting platform enclosed by tower-crane-body-connected support beams 2000 to move up and down synchronously, implementing overall lifting/lowering of the hoisting platform. Two ends of the tower-crane-body-connected support beam 2000 are connected to the tower crane body lifting/lowering part 1000 through a plurality of hinged bases, and are configured to connect two adjacent tower crane body lifting/lowering parts 1000, to stabilize the tower crane body and provide the effect of a sliding track and bearing support for a primary moving beam 4000 and an auxiliary moving beam 3000 simultaneously. The tower crane body lifting/lowering part 1000 is the self-climbing lifting/lowering system fastened to a tower crane body, and can automatically complete lifting/lowering along the tower crane body by using the tower crane body with standard sections as a support and the hydraulic cylinder as a lifting/lowering force, and in combination with the pneumatic locking mechanism. Steel wire winches are installed on standard sections at two ends of each tower-crane-body-connected support beam 2000, and sliding trolleys are provided below the standard sections, with a specific structure shown in FIG. 3. The steel wire winches can pull the sliding trolleys to move along the tower-crane-body-connected support beam 2000. The tower-crane-body-connected support beams 2000 include: a tower-crane-body-connected support beam a2000a, connected between a tower crane body lifting/lowering part a1000a and a tower crane body lifting/lowering part d1000d; a tower-crane-body-connected support beam b2000b, connected between the tower crane body lifting/lowering part a1000a and a tower crane body lifting/lowering part b1000b; a tower-crane-body-connected support beam c2000c, connected between the tower crane body lifting/lowering part b1000b and a tower crane body lifting/lowering part c1000c; and a tower-crane-body-connected support beam d2000d, connected between the tower crane body lifting/lowering part c1000c and the tower crane body lifting/lowering part d1000d. Two ends of the auxiliary moving beam 3000 are respectively fastened under sliding trolleys of the tower-crane-body-connected support beam b2000b and the tower-crane-body-connected support beam d2000d, and the sliding trolleys can drive the auxiliary moving beam 3000 to move along axis directions of the tower-crane-body-connected support beam b2000b and the tower-crane-body-connected support beam d2000d. Two ends of the primary moving beam 4000 are respectively fastened under sliding trolleys of the tower-crane-body-connected support beam a2000a and the tower-crane-body-connected support beam c2000c, and the sliding trolleys can drive the primary moving beam 4000 to move along axis directions of the tower-crane-body-connected support beam a2000a and the tower-crane-body-connected support beam c2000c.

Figure 18:
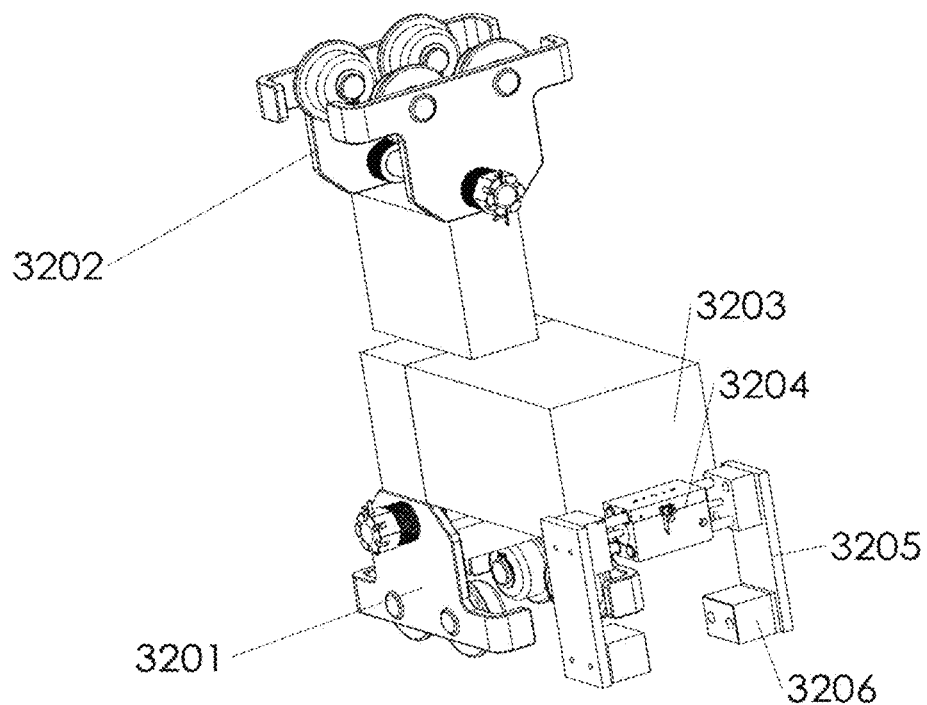
FIG. 18 is a structural diagram of a moving beam connecting mechanism.
Figure 19:
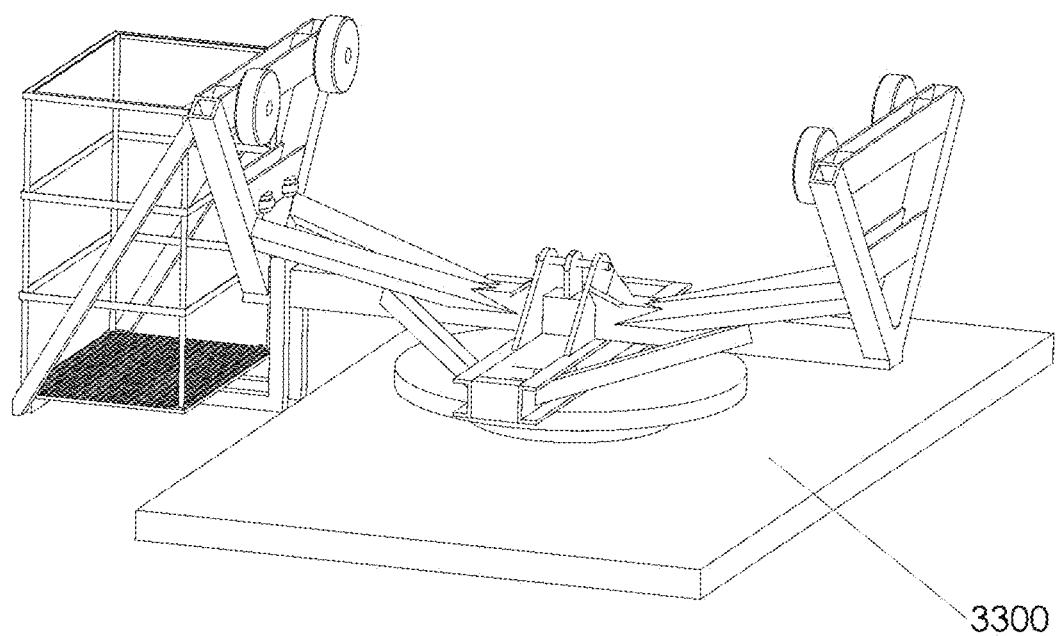
FIG. 19 is a structural diagram of a sliding trolley b.

The auxiliary moving beam 3000 and the primary moving beam 4000 are vertical to each other, I-beams are installed below the auxiliary moving beam 3000 and above the primary moving beam 4000, and the I-beams are connected by a moving beam connecting mechanism 3200. A specific structure of the moving beam connecting mechanism 3200 is shown in FIG. 18. When a two-way cylinder extends, a position below the moving beam connecting mechanism 3200 matches an I-beam above the primary moving beam 4000 through an I-beam pulley. A position above the moving beam connecting mechanism 3200 matches an I-beam below the auxiliary moving beam 3000 through an I-beam pulley, and the auxiliary moving beam 3000 can move along an axis of the primary moving beam 4000. When moving synchronously with a hoisting trolley for the primary moving beam 4000, the auxiliary moving beam 3000 can provide a support force at a bearing position of the primary moving beam 4000, improving a bearing capacity of the primary moving beam 4000 and increasing stability and a hoisting capacity. When the primary moving beam 4000 needs to move axially, a two-way oil cylinder at an end of an I-beam pulley c2303 is controlled to extend, a brake is loosened, a two-way oil cylinder is retracted, and the I-beam above the moving beam connecting mechanism 3200 and the I-beam above the primary moving beam 4000 are locked and fastened. The position above the moving beam connecting mechanism 3200 matches the I-beam below the auxiliary moving beam 3000 through the fastened I-beam pulley, and the auxiliary moving beam 3000 can move by a distance along the axis of the primary moving beam 4000. Under the premise that one end of the primary moving beam 4000 is not separated from the sliding trolley, the other end of the entire primary moving beam 4000 extends by a distance outside an area enclosed by the tower-crane-body-connected support beams 2000. To be specific, four tower crane body lifting/lowering parts 1000 can be adjusted accordingly based on a shape of a building. Further, the two-way oil cylinder at an end of the I-beam pulley c2303 is controlled to be retracted, the brake is locked, the primary moving beam 4000 is stuck and fastened, and the hoisting trolley below the primary moving beam 4000 can move outside the square area to hoist a cargo, resolving a problem that an engineering vehicle cannot enter a construction area and unload the cargo. A specific logical relationship of the above structure is as follows:

The tower crane body lifting/lowering part 1000 includes tower crane bodies 1100 and self-climbing lifting/lowering systems 1200 disposed on the tower crane bodies 1100. Four tower crane bodies 1100 are bodies of tower cranes at a construction site and are firmly placed at four corners of a building, and the four tower cranes form a periphery of the square area by enclosure and are used as bearing support of the hoisting platform. An I-beam standard support 1201 of the self-climbing lifting/lowering system 1200 is firmly connected by a connecting bolt of a standard section of the tower crane, and the self-climbing lifting/lowering system 1200 can climb or descend step by step along the tower crane body 1100 to drive the tower-crane-body-connected support beam 2000 up and down, and then lift or lower the hoisting platform based on the height of a building under construction. The self-climbing lifting/lowering system 1200 includes an I-beam standard support 1201, an I-beam a1202, a steel plate 1203, a hinged base 1204, a locking system a1210, and a climbing system 1220. A logical relationship between the above components is described below.

Figure 11:
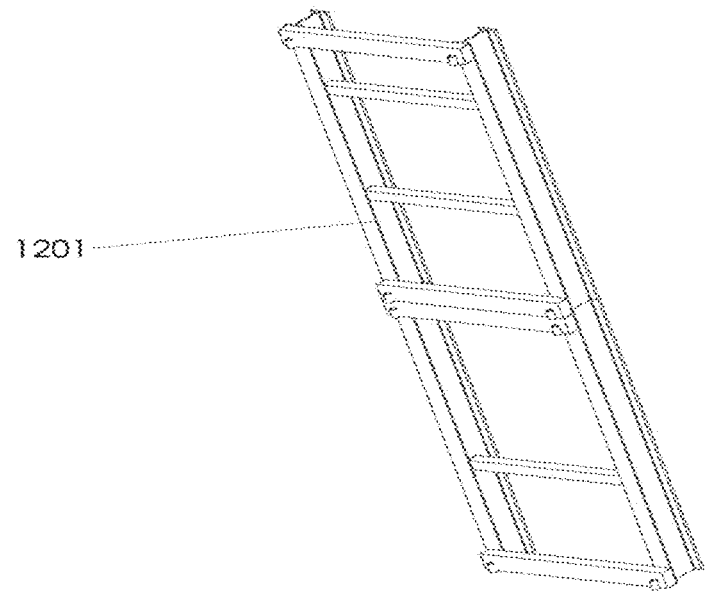
FIG. 11 is a structural diagram of an I-beam standard support.
Figure 12:
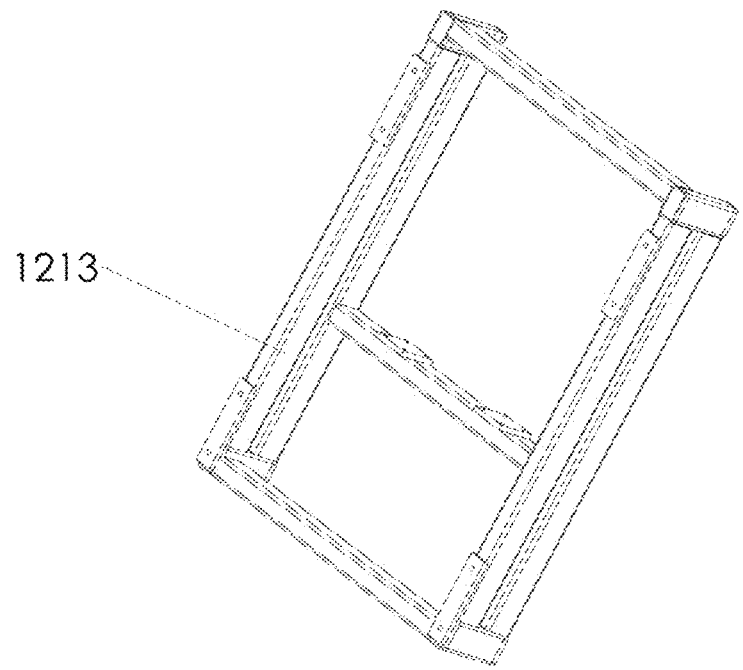
FIG. 12 is a structural diagram of a locking system support.
Figure 13:
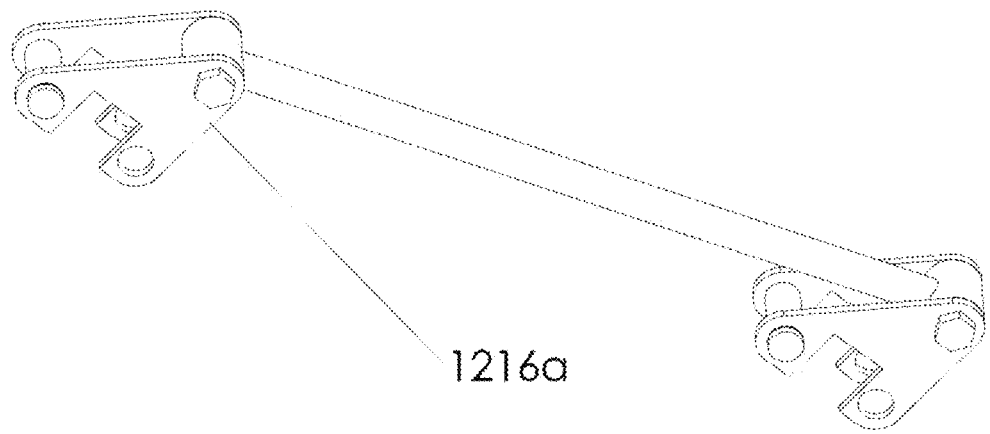
FIG. 13 is a structural diagram of a locking push rod.
Figure 14:
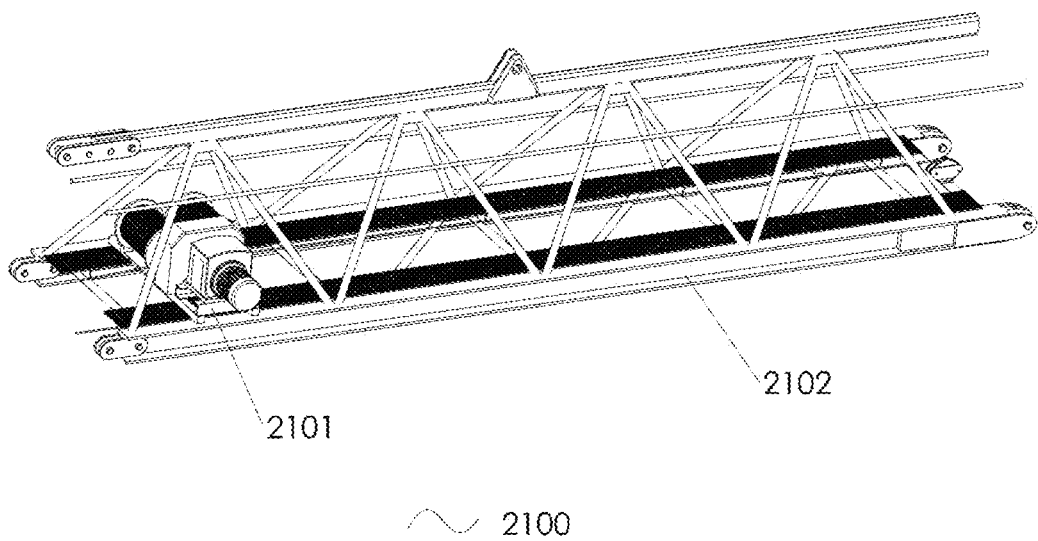
FIG. 14 is a structural diagram of a standard section at an end of the support beam.

A structure of the I-beam standard support 1201 is shown in FIG. 11, which is a ladder steel frame welded by high-strength cross beams and two I-beams. Two ends of the cross beam at a lower bottom surface of the two I-beams are welded with bolt holes, and the bolt holes are firmly connected to the tower crane body 1100 through bolts between standard sections of the tower crane body 1100. The cross beam between the two I-beams is configured to reinforce the I-beam standard support 1201. Clamping grooves in locking push rods of the locking system a1210 and a locking system b1221 can clamp the cross beams, and are used to fasten the locking system a1210 and the locking system b1221 to the I-beam standard support 1201, and then lifting/lowering the self-climbing lifting/lowering system 1200 is completed through cooperation of the locking system a1210, the locking system b1221, and the climbing system 1220. A plurality of I-beam standard supports 1201 can be spliced and installed along a side surface of the tower crane body 1100, and the height of the I-beam standard support is increased based on construction requirements, to lift an entire hoisting platform. The I-beam a1202 is an I-beam track including two high-strength I-beams, and the two high-strength I-beams are welded and fastened as a whole by a square steel a1223a and a square steel b1223b. The combined I-beam track matches four I-beam pulleys b1222, and the I-beam a1202 can move only along an axis thereof. The steel plate 1203 is a high-strength steel plate, a lower part of a lower surface of the steel plate is fastened to an upper surface of the I-beam a1202 by welding, and an upper part of the lower surface is fastened to an upper part of the four I-beam pulleys a1211 through a bolt. When the I-beam a1202 moves along an axis thereof, the steel plate 1203 is driven to move up and down, and then the locking system a1210 is driven to move up and down. The hinged base 1204 includes a plurality of hinged supports and is fastened to the upper surface of the steel plate 1203 through a bolt, with a specific structure shown in FIG. 6. Three hinged supports on a lower part are configured to hinge and fasten the standard section 2100 at an end of the support beam, two hinged supports on an upper part are connected to one end of a steel wire rope, the other end of the steel wire rope is connected to an upper anchor joint of a standard section 2200 in the middle of the support beam, and the tower-crane-body-connected support beam 2000 is reinforced in a manner of diagonal tensioning of the steel wire rope.

Figure 8:
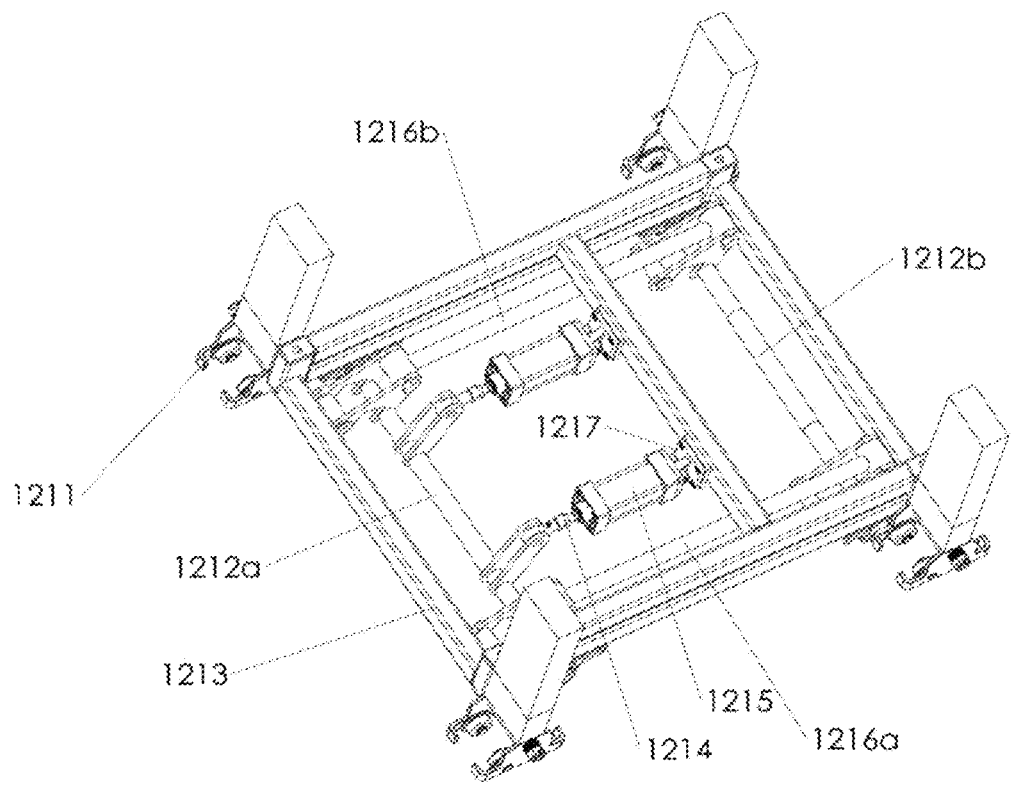
FIG. 8 is a structural diagram of a locking system.
Figure 9:
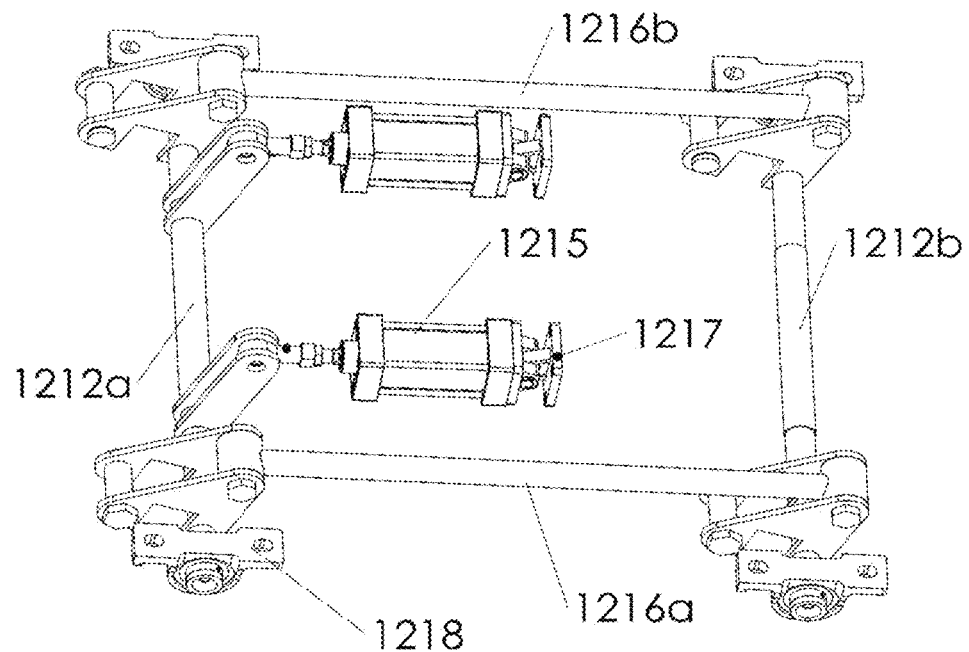
FIG. 9 is an internal detail drawing of the locking system.
Figure 10:
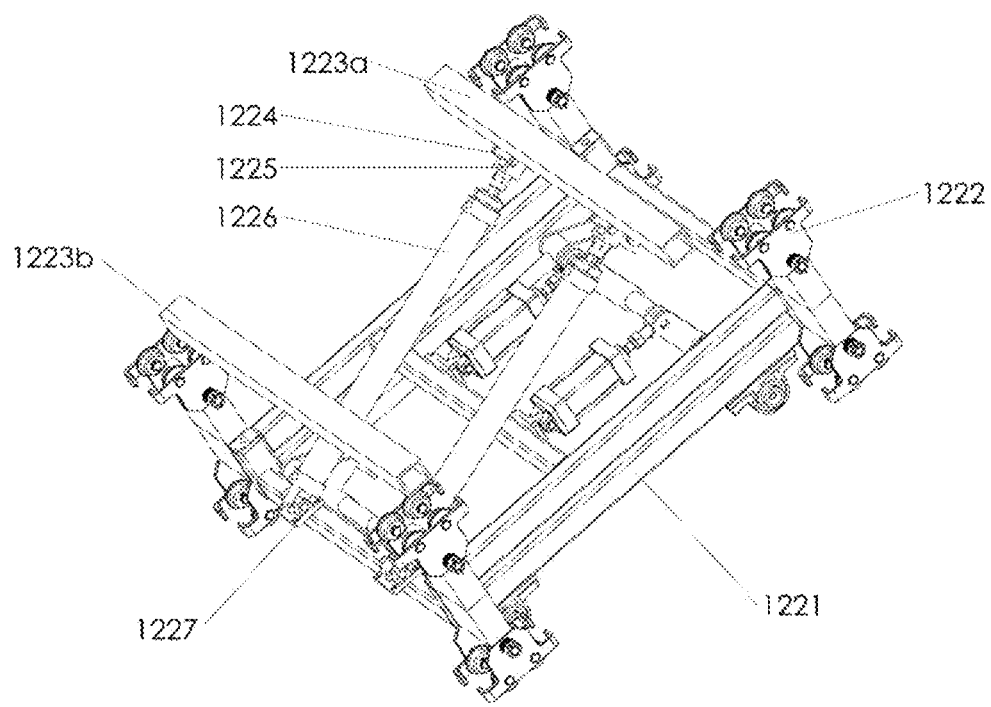
FIG. 10 is a structural diagram of a climbing system.

The locking system a1210 includes an I-beam pulley a1211, a rotating shaft a1212a, a rotating shaft b1212b, a locking system support 1213, a short hydraulic cylinder Y-shaped joint 1214, a short hydraulic cylinder 1215, a locking push rod a1216a, a locking push rod b1216b, a short hydraulic cylinder hinged base 1217, and a support bearing 1218. A specific logical relationship among the above components is as follows:

the locking system support 1213 has a structure shown in FIG. 8 and is configured to support and carry the locking system a1210 through a square frame that is welded by a high-strength steel; and the four I-beam pulleys a1211 are fastened at positions on four corner sides of the locking system support 1213 based on the structure shown in FIG. 8, the four I-beam pulleys a1211 match I-beam tracks of the I-beam standard support 1201, and the locking system support 1213 can move up and down only along the I-beam tracks of the I-beam standard support 1201. Four support bearings 1218 are fastened at the bottoms of four corners of the locking system support 1213 and are configured to support and restrain a rotating shaft a1212*a* and a rotating shaft b1212*b*. The rotating shaft a1212*a* and the rotating shaft b1212*b* have structures shown in FIG. 9 and two ends respectively connected to inner holes of the four support bearings 1218 through interference fit. As shown in the structure in FIG. 8, two ends toward the inside are respectively connected to a shaft hole of the locking push rod a1216*a* and a shaft hole of the locking push rod b1216*b* through keyway cooperation. Two connecting rods are firmly welded in the middle of the rotating shaft a1212*a*, and pin holes in the two connecting rods are connected to heads of the two short hydraulic cylinder Y-shaped joints 1214 through pin shafts. Pin holes in the heads of the two short hydraulic cylinder Y-shaped joints 1214 are connected to the two connecting rods at the rotating shaft a1212*a* through the pin shafts, and tails of the two short hydraulic cylinder Y-shaped joints 1214 are in threaded connection with heads of telescopic rods of the two short hydraulic cylinders 1215. Tails of the short hydraulic cylinders 1215 are hinged with a cross beam of the locking system support 1213 through the short hydraulic cylinder hinged base 1217.

A specific working principle of the locking system a1210 is as follows. When telescopic ends of the two short hydraulic cylinders 1215 extend to push the two connecting rods of the rotating shaft a1212*a* to rotate, the rotating shaft a1212*a* is driven to rotate around an axis, and an irregular part at one end of the locking push rod a1216*a* is further driven to rotate 90 degrees around the axis of the rotating shaft a1212*a*. The irregular part pulls the locking push rod a1216*a*, the connecting rod in the middle of the locking push rod b1216*b* moves to drive an irregular part at the other end to rotate 90 degrees around the rotating shaft b1212*b*, and irregular parts at two ends of the locking push rod a1216*a* and the locking push rod b1216*b* are provided with openings respectively. After rotation by 90 degrees, the openings can clamp a cross beam between two I-beams of the I-beam standard support 1201, to implement fastened locking, so that the locking system a1210 is firmly connected to the I-beam standard support 1201, and the self-climbing lifting/lowering system 1200 is firmly connected to the tower crane body 1100, preventing the locking system a1210 and a steel plate 1203 fastened to the locking system from falling. If the locking system is disconnected from the I-beam standard support 1201, telescopic rods of the two short hydraulic cylinders 1215 are controlled to retract, the locking push rod of the locking system b1221 is pulled and rotated 90 degrees in an opposite direction, and the cross beam of the I-beam standard support 1201 is loosened, so that detachment can be completed.

The climbing system 1220 includes a locking system b1221, an I-beam pulley b1222, a square steel a1223*a*, a square steel b1223*b*, a long hydraulic cylinder hinged base a1224, a long hydraulic cylinder Y-shaped joint 1225, a long hydraulic cylinder 1226, and a long hydraulic cylinder hinged base b1227. A logical relationship among the components is as follows.

A structure of the locking system b1221 is the same as a structure of the locking system a1210, and working principles are the same: when telescopic ends of the two short hydraulic cylinders extend to push two connecting rods of the rotating shaft to rotate, the rotating shaft is driven to rotate around an axis, and then the irregular part at one end of the locking push rod is driven to rotate 90 degrees around the axis of the rotating shaft, the irregular part pulls the locking push rod, the connecting rod in the middle of the locking push rod moves to drive the irregular part at the other end to rotate 90 degrees around the rotating shaft, and irregular parts at two ends of the locking push rods are provided with openings. After rotation by 90 degrees, the openings can clamp a cross beam between two I-beams of the I-beam standard support 1201, to implement fastened locking, so that the locking system is firmly connected to the I-beam standard support 1201, and the self-climbing lifting/lowering system 1200 is firmly connected to the tower crane body 1100, preventing the locking system and a steel plate fastened to the locking system from falling. The locking system b1221 can move axially only along two I-beam tracks of the I-beam standard support 1201, and can be firmly connected to the I-beam standard support 1201 in the above locking principle. The four I-beam pulleys b1222 are firmly connected to upper parts of four I-beam pulleys for the locking system b1221 based on a structure shown in FIG. 10, and the four I-beam pulleys b1222 match an I-beam a1202 and can move only along an axis of the I-beam b1202. A square steel a1223*a*, a square steel b1223*b*, and two I-beams a1202 are welded and fastened as a whole. The two long hydraulic cylinder hinged bases a1224 are fastened to a side surface of the square steel a1223*a* through a bolt, and the two long hydraulic cylinder hinged bases b1227 are fastened to a side surface of a support cross beam of the locking system b1221. Cylinder tails of the two long hydraulic cylinders 1226 are connected to the two long hydraulic cylinder hinged bases b1227 through pin shafts respectively, heads of telescopic ends of the two long hydraulic cylinders 1226 are in threaded connection with threads at tails of the two long hydraulic cylinder Y-shaped joints 1225 respectively, and heads of the two long hydraulic cylinder Y-shaped joints 1225 are respectively connected to the long hydraulic cylinder hinged base a1224 through pin shafts.

A working principle of the self-climbing lifting/lowering system 1200 is as follows.

(1) Climbing: in an initial state, when the locking system b1221 is firmly connected to the I-beam standard support 1201 through the locking push rod, the short hydraulic cylinder 1215 is controlled to pull the locking push rod 11216*a* of the locking system a1210 to rotate 90 degrees in an opposite direction, a cross beam of the I-beam standard support 1201 is loosened, and the locking system a1210 is separated from the I-beam standard support 1201; when telescopic rods of the two long hydraulic cylinders 1226 extend, a lower length of the I-beam a1202 is relatively long, so that two I-beams a1202 can be pushed to move upward, then steel plates 1203 fastened to the two I-beams and a locking system a1210 are driven to move upward, and the locking system b1221 moves relative to the I-beam a1202 through the I-beam pulley b1222. When the telescopic rods of the two long hydraulic cylinders 1226 fully extend to a maximum position, the locking system a1210 reaches a highest position of climbing and is firmly connected to the I-beam standard support 1201 through the locking push rod; and the self-climbing lifting/lowering system 1200 is lifted by a height of a standard section and is firmly connected to the I-beam standard support 1201. Further, the short hydraulic cylinder is controlled to pull the locking push rod of the locking system b1221 to rotate 90 degrees in an opposite direction, the cross beam of the I-beam standard support 1201 is loosened, and the telescopic rods of the two long hydraulic cylinders 1226 are completely retracted to pull the locking system b1221 to move upward. The I-beam pulley b1222 fastened to the locking system b1221 moves upwards along the I-beam a1202. When moving to a maximum position, the locking system b1221 is clamped at the cross beam of the I-beam standard support 1201 through the locking push rod, implementing a fastened connection. When the self-climbing lifting/lowering system 1200 continuously climbs, repeat the above actions for climbing step by step along the tower crane body. After the self-climbing lifting/lowering system 1200 climbs to a specified position, the locking system a1210 and the locking system b1221 are firmly connected to the I-beam standard support 1201 through the locking push rod, to ensure stability of the hoisting platform and a tower crane body structure.

(2) Descending: the short hydraulic cylinder is controlled to pull the locking push rod of the locking system b1221 to rotate 90 degrees in an opposite direction, the cross beam of the I-beam standard support 1201 is loosened, the telescopic rods of the two long hydraulic cylinders 1226 extend fully to push the locking system b1221 to move downward, and the I-beam pulley b1222 fastened to the locking system b1221 moves downward along the I-beam a1202. When the I-beam pulley b1222 moves to a maximum position, the locking system b1221 is clamped into the cross beam of the I-beam standard support 1201 through the locking push rod, implementing a fastened connection. Further, the short hydraulic cylinder 1215 is controlled to pull the locking push rod a1216a of the locking system a1210 to rotate 90 degrees in an opposite direction, the cross beam of the I-beam standard support 1201 is loosened, and the locking system a1210 is separated from the I-beam standard support 1201. When the telescopic rods of the two long hydraulic cylinders 1226 are controlled to retract, the two I-beams a1202 can be pulled to move downward, then the steel plate 1203 fastened to the two I-beams and the locking system a1210 are driven to move downward, and the locking system b1221 moves relative to the I-beam a1202 through the I-beam pulley b1222. When the telescopic rods of the two long hydraulic cylinders 1226 are fully retracted, the locking system a1210 is lowered to a lowest position and is firmly connected to the I-beam standard support 1201 through the locking push rod. The self-climbing lifting/lowering system 1200 is lowered by a height of a standard section and is firmly connected to the I-beam standard support 1201. When the self-climbing lifting/lowering system 1200 is continuously lowered, repeat the above actions for lowering step by step along the tower crane body. After the self-climbing lifting/lowering system 1200 is lowered to a specified position, the locking system a1210 and the locking system b1221 are firmly connected to the I-beam standard support 1201 through the locking push rod, to ensure stability of the hoisting platform and a tower crane body structure.

Two ends of the tower-crane-body-connected support beam 2000 are connected to the tower crane body lifting/lowering part 1000 through three hinged bases, and are configured to connect two adjacent tower crane body lifting/lowering parts 1000, to stabilize the tower crane body and provide the effect of a sliding track and bearing support for the primary moving beam 4000 and the auxiliary moving beam 3000 simultaneously. Steel wire winches are installed on standard sections at two ends of each tower-crane-body-connected support beam 2000, and sliding trolleys are provided below the standard sections, with a specific structure shown in FIG. 16. The steel wire winches can pull the sliding trolleys to move along the tower-crane-body-connected support beam 2000. The tower-crane-body-connected support beams 2000 include: a tower-crane-body-connected support beam a2000a, connected between a tower crane body lifting/lowering part a1000a and a tower crane body lifting/lowering part d1000d; a tower-crane-body-connected support beam b2000b, connected between the tower crane body lifting/lowering part a1000a and a tower crane body lifting/lowering part b1000b; a tower-crane-body-connected support beam c2000c, connected between the tower crane body lifting/lowering part b1000b and a tower crane body lifting/lowering part c1000c; and a tower-crane-body-connected support beam d2000d, connected between the tower crane body lifting/lowering part c1000c and the tower crane body lifting/lowering part d1000d.

Figure 15:
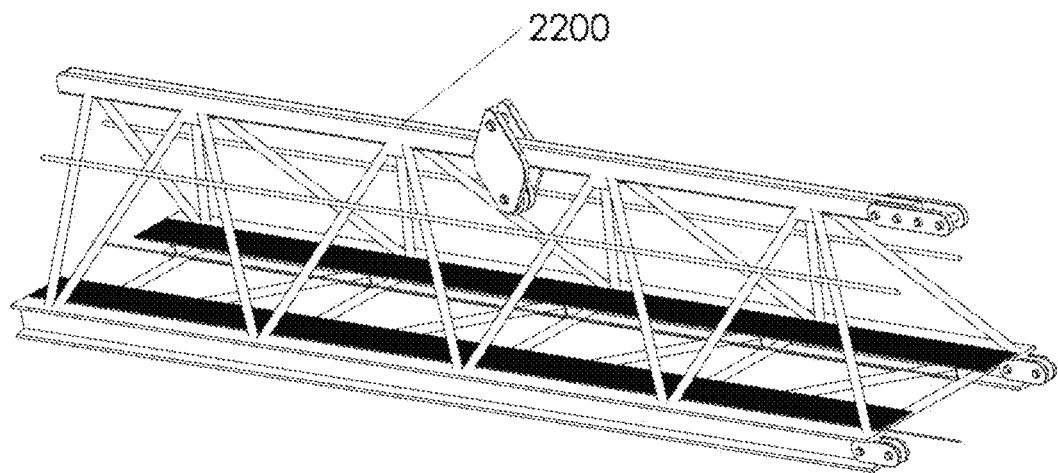
FIG. 15 is a structural diagram of a standard section in the middle of the support beam.
Figure 41:
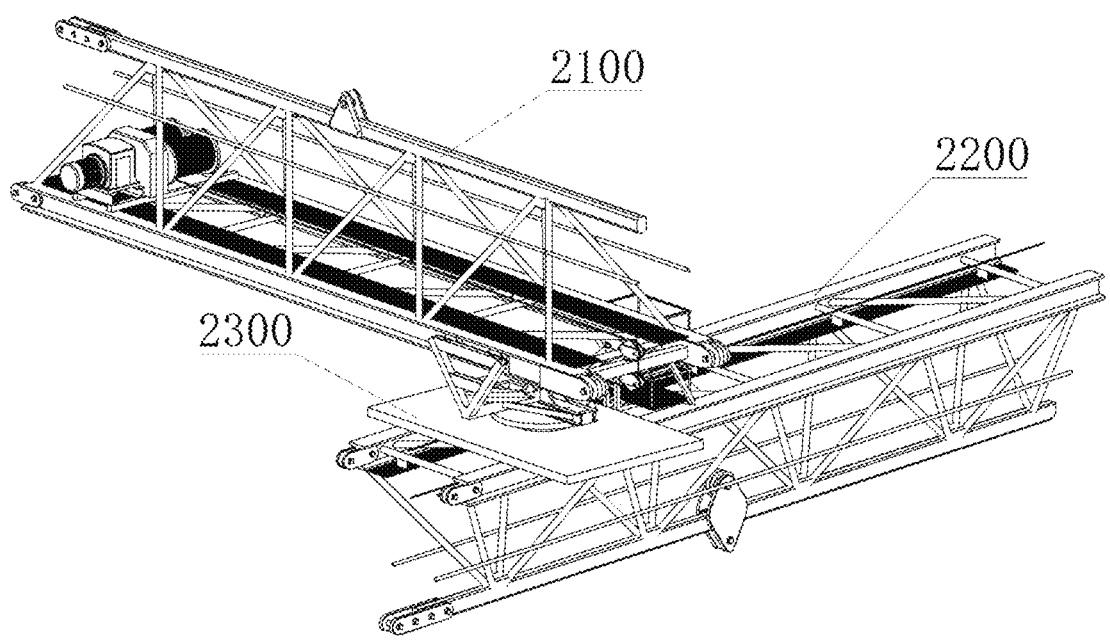
FIG. 41 is a schematic diagram of connection between standard sections in the middle and at an end of the support beam.

A standard section 2100 at an end of the support beam includes a winch A2101 and a standard section 2102 at the end. One terminal of the standard section 2102 at the end is firmly connected to the self-climbing lifting/lowering system 1200 through three hinged bases 1204. When a plurality of self-climbing lifting/lowering systems 1200 are synchronously lifted or lowered, the standard section 2102 at the end can be driven to lift or lower synchronously. The winch a2101 is fastened above the standard section 2102 at the end based on a structure shown in FIG. 14 and can tow a sliding trolley a2300 to move along an axis of the tower-crane-body-connected support beam 2000 through a steel wire rope. A structure of a standard section 2200 in the middle of the support beam is shown in FIG. 15 and FIG. 41, one end is firmly connected to the standard section 2100 at the end of the support beam, and the other end is connected to another standard section 2200 in the middle of the support beam. Based on a distance between two tower crane body lifting/lowering parts 1000, a plurality of standard sections 2200 in the middle of the support beams can be connected, so that a quantity of connection between the standard sections 2200 in the middle of the support beams is changed, and the length of the tower-crane-body-connected support beam 2000 can be changed.

Figure 16:
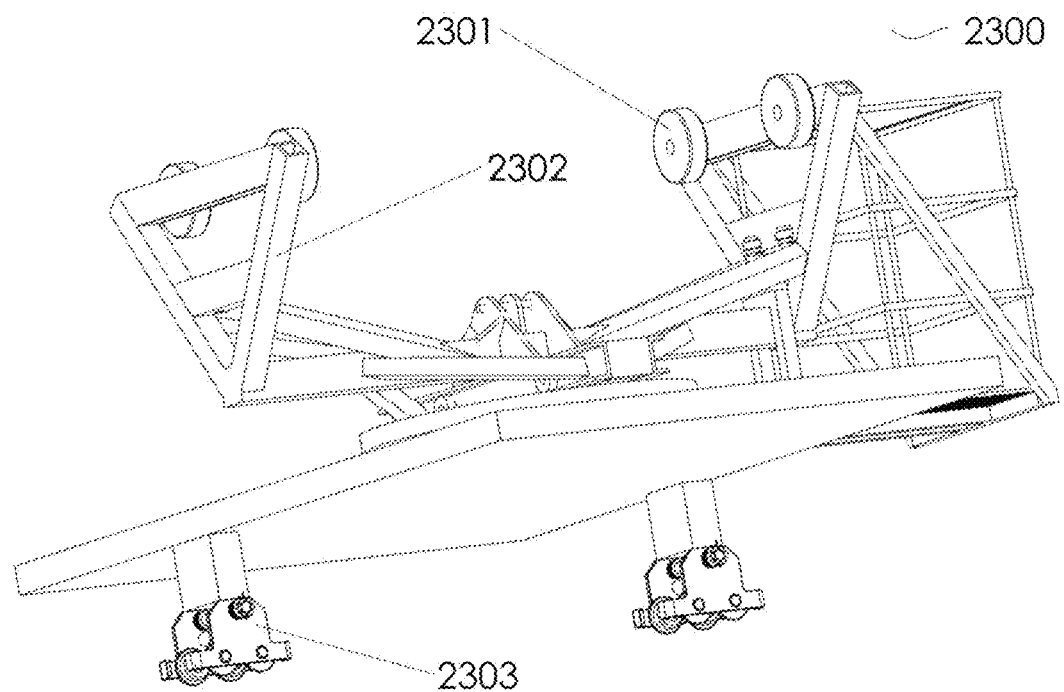
Figure 17:
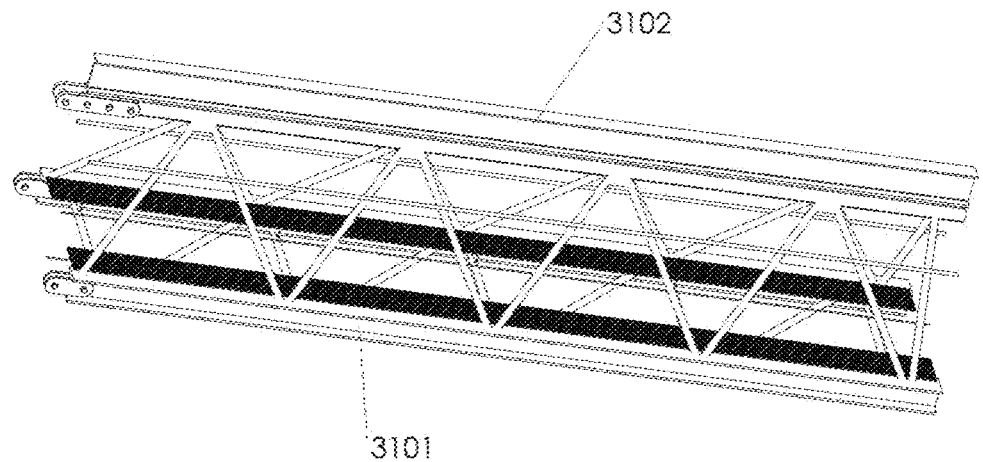
FIG. 17 is a structural diagram of an auxiliary moving beam standard section.

The sliding trolley a2300 includes trolley wheels 2301, a trolley support 2302, and an I-beam pulley c2303. Based on a structure shown in FIG. 16, the trolley wheels 2301 are installed on two sides of the trolley support 2302 and match an I-beam track at a lower part of the tower-crane-body-connected support beam 2000. The sliding trolley a2300 can move along an axis of the tower-crane-body-connected support beam 2000. A structure of the trolley support 2302 is shown in FIG. 16. A lower part of the trolley support is provided with a large rotating turntable, to prevent a sliding trolley a2300 on a tower-crane-body-connected support beam 2000 on an opposite side from generating an error or shaking due to asynchronous movement distances, causing the auxiliary moving beam 3000 and the primary moving beam 4000 to produce internal forces. The rotating turntable can allow the auxiliary moving beam 3000 and the primary moving beam 4000 to produce slight deformation and rotation. The I-beam pulley c2303 is firmly installed below the large rotating turntable of the trolley support 2302 through a bolt and matches an I-beam c4102 above a standard section 4100 in the middle of the primary moving beam. An end of the I-beam pulley c2303 is also provided with a brake with a structure the same as a structure of a moving beam connecting mechanism 3200, and is provided with components such as a two-way oil cylinder installing block 3203, a two-way oil cylinder 3204, a brake block installing plate 3205, and a brake block 3206, so that the primary moving beam 4000 can be clamped, preventing one end of the primary moving beam from detaching from the sliding trolley when moving along an axis during hoisting and producing danger. When the primary moving beam 4000 needs to move axially, the two-way oil cylinder at an end of the I-beam pulley c2303 is controlled to extend, the brake is loosened, a two-way oil cylinder of the moving beam connecting mechanism 3200 is retracted, and the moving beam connecting mechanism 3200 and an I-beam above the primary moving beam 4000 are locked and fastened. The position above the moving beam connecting mechanism 3200 matches the I-beam below the auxiliary moving beam 3000 through the firmly connected I-beam pulley, and the auxiliary moving beam 3000 can move by a distance along the axis of the primary moving beam 4000. Under the premise that one end of the primary moving beam 4000 is not separated from the sliding trolley, the other end of the entire primary moving beam 4000 extends by a distance outside a square area enclosed by the tower-crane-body-connected support beams 2000. Further, the two-way oil cylinder at an end of the I-beam pulley c2303 is controlled to be retracted, the brake is locked, the primary moving beam 4000 is stuck and fastened, and the hoisting trolley below the primary moving beam 4000 can move outside the square area to hoist a cargo, resolving a problem that an engineering vehicle cannot enter a construction area and unload the cargo.

Figure 20:
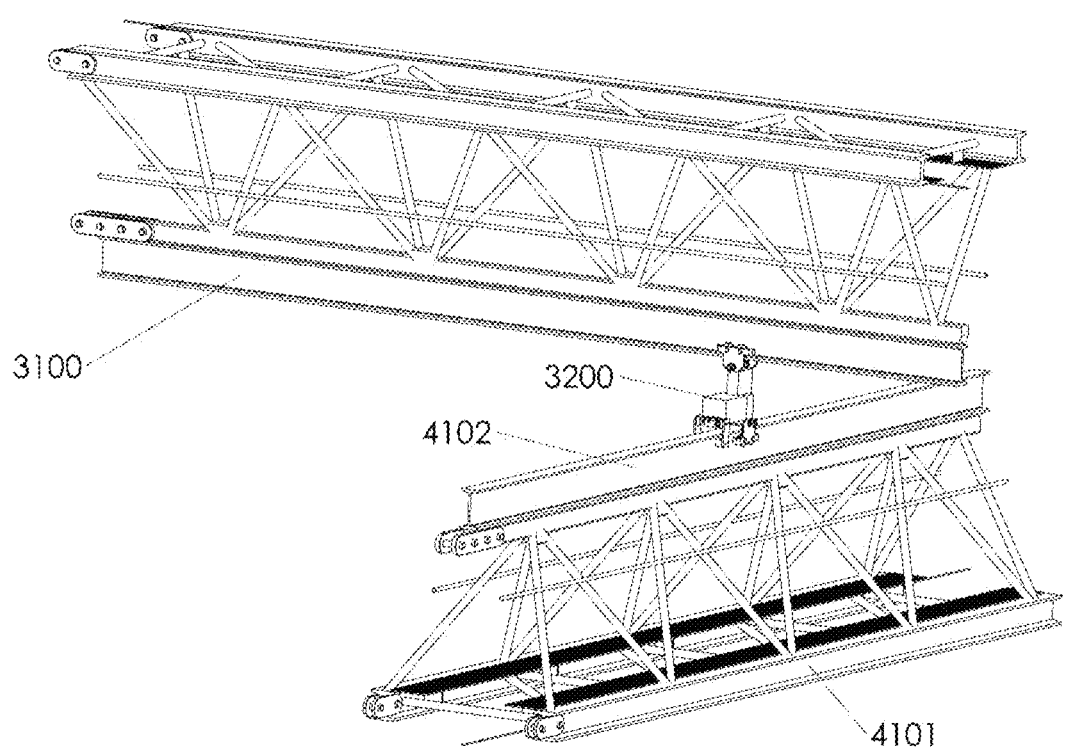
FIG. 20 is a structural diagram of connection between a primary moving beam and the auxiliary moving beam.
Figure 21:
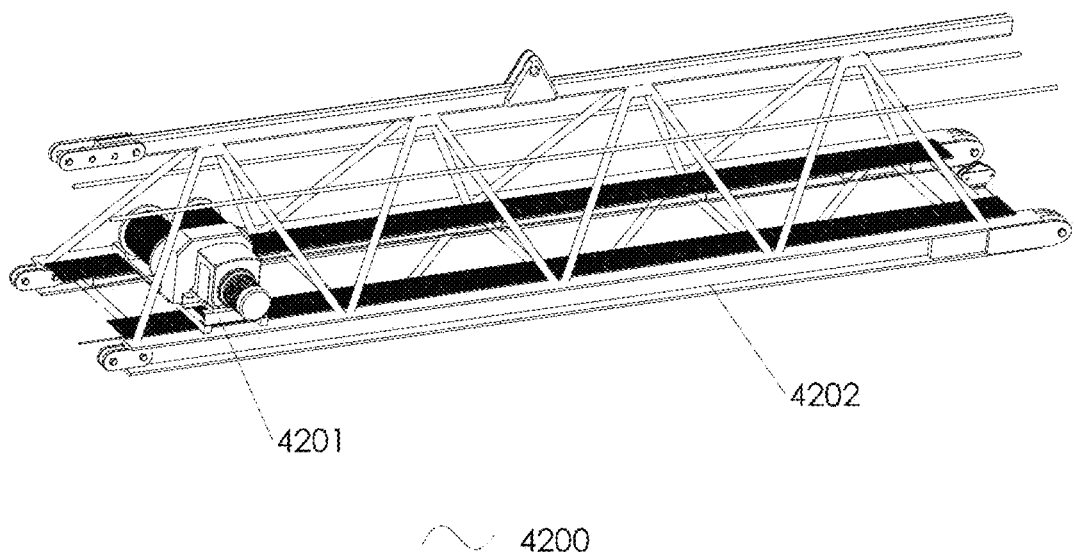
FIG. 21 is a structural diagram of a standard section at an end of the primary moving beam.
Figure 22:
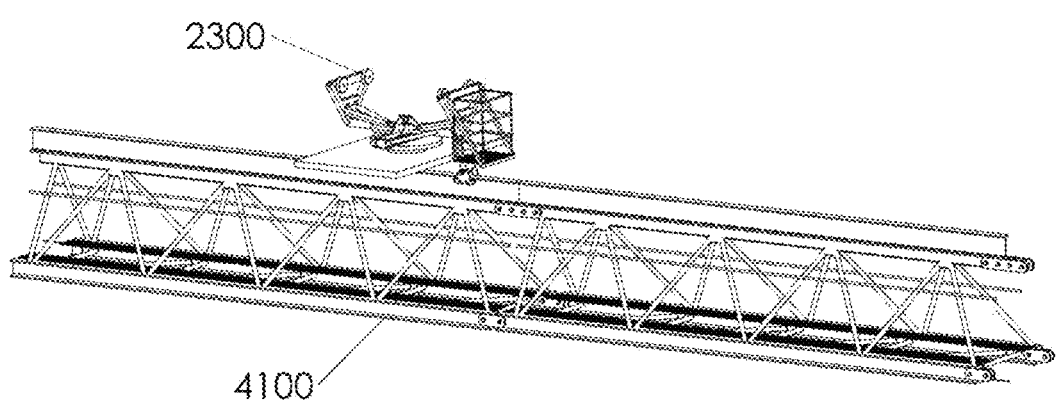
FIG. 22 is a structural diagram of connection between the primary moving beam and a sliding trolley.
Figure 23:
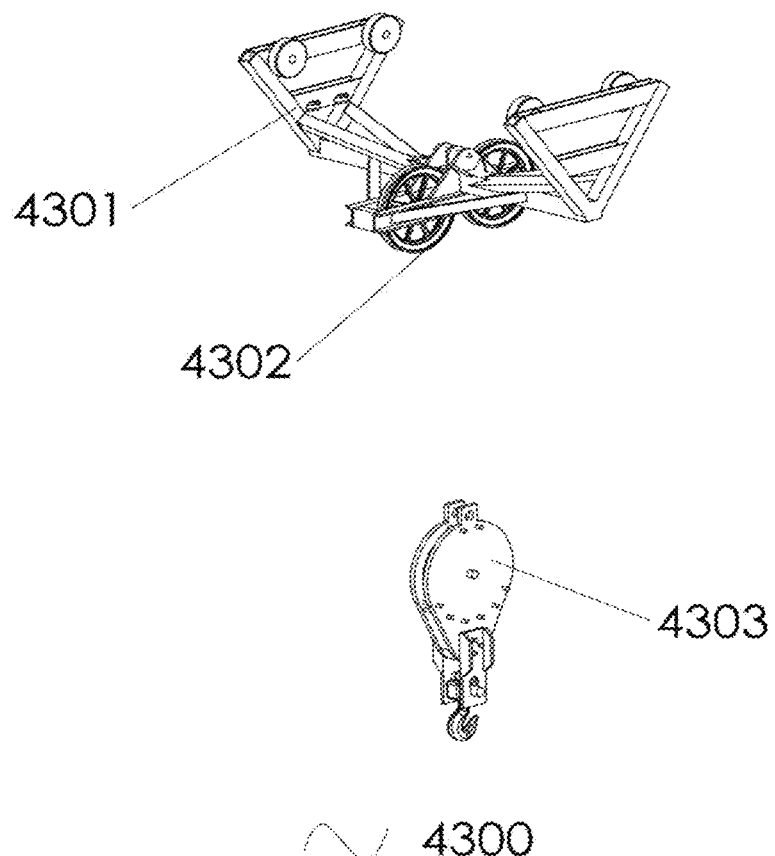
FIG. 23 is a structural diagram of a hoisting trolley.
Figure 24:
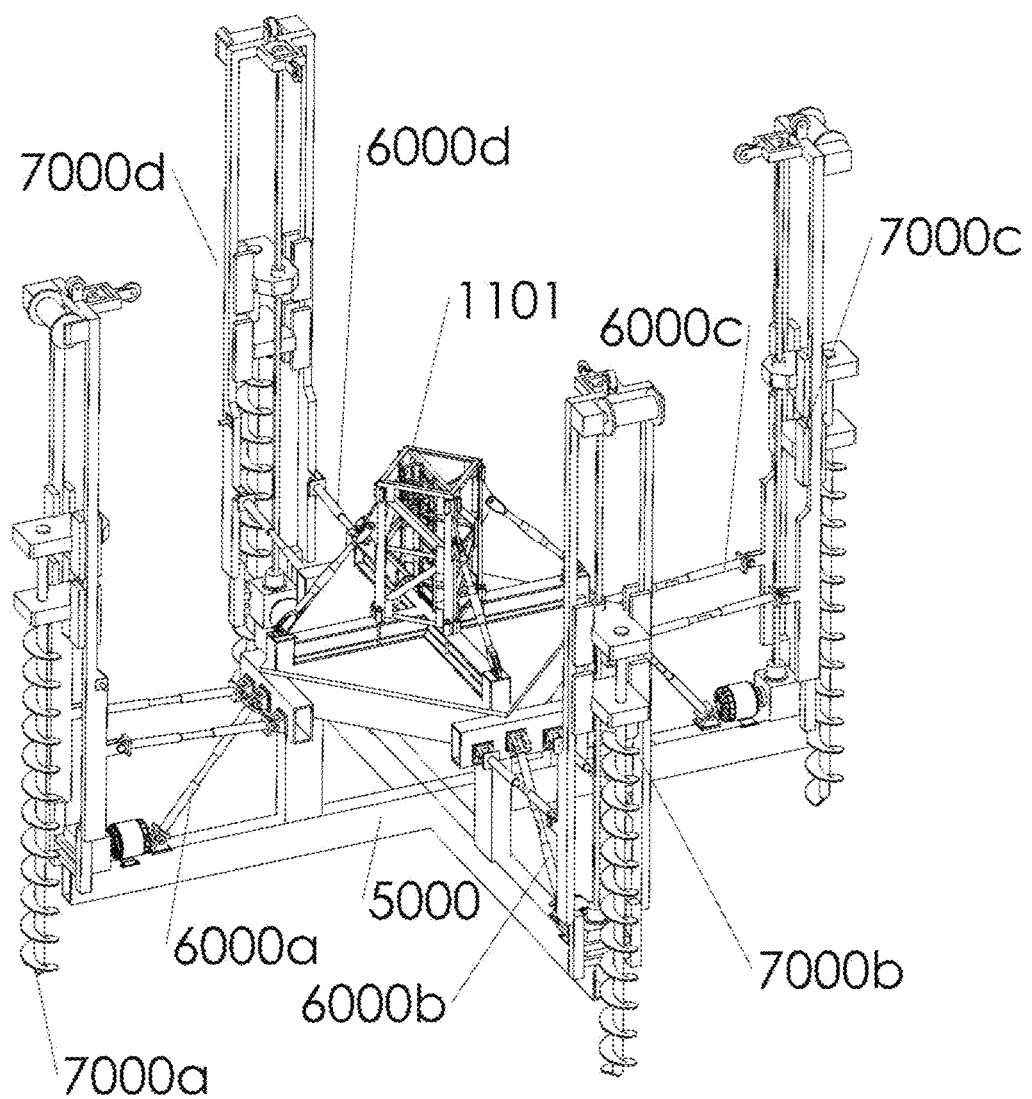
FIG. 24 is an overall structural diagram of a bearing platform.
Figure 25:
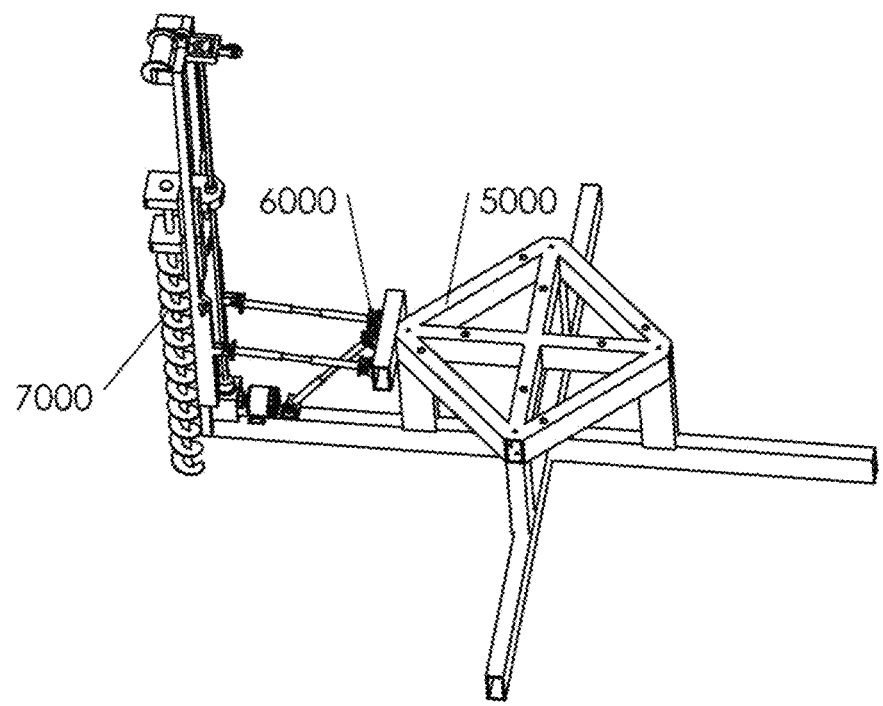
FIG. 25 is a detailed structural diagram of the bearing platform.

A structure of the auxiliary moving beam 3000 is shown in FIG. 20, including an auxiliary moving beam standard section 3100, the moving beam connecting mechanism 3200, and a sliding trolley b3300. The auxiliary moving beam standard section 3100 includes an auxiliary moving beam standard section steel frame 3101 and an I-beam b3102, with a structure shown in FIG. 17. The I-beam b3102 is welded and fastened above the auxiliary moving beam standard section steel frame 3101, an I-beam at the bottom of the auxiliary moving beam standard section steel frame 3101 is firmly connected to a bolt at the bottom of the sliding trolley b3300, and the I-beam b3102 matches an I-beam pulley e3202 of the moving beam connecting mechanism 3200. When the primary moving beam 4000 moves along an axis of the auxiliary moving beam 3000, the I-beam pulley e3202 of the moving beam connecting mechanism 3200 is driven to move along the I-beam b3102, ensuring that the primary moving beam 4000 is not stuck because of the auxiliary moving beam 3000 when moving along the axis of the auxiliary moving beam 3000. A structure of the sliding trolley b3300 is the same as a structure of the sliding trolley a2300, both of which are respectively below a tower-crane-body-connected support beam b2000b and a tower-crane-body-connected support beam d2000d. The auxiliary moving beam 3000 can be driven by the winch to move along an axis of the tower-crane-body-connected support beam b2000b and an axis of the tower-crane-body-connected support beam d2000d. The auxiliary moving beam standard sections 3100 can be connected and combined end to end in pairs. A quantity of the auxiliary moving beam standard sections 3100 is changed based on construction requirements, and then the length of the auxiliary moving beam 3000 is changed.

The moving beam connecting mechanism 3200 includes an I-beam pulley d3201, an I-beam pulley e3202, a two-way oil cylinder installing block 3203, a two-way oil cylinder 3204, a brake block installing plate 3205, and a brake block 3206. A top of the I-beam pulley d3201 is firmly connected to and perpendicular to a top of the I-beam pulley e3202. As shown in a structure in FIG. 18, the I-beam pulley d3201 can move along an I-beam c4102 of a standard section 4100 in the middle of the primary moving beam, and the I-beam pulley e3202 can move along the I-beam b3102 of the auxiliary moving beam standard section 3100. The two-way oil cylinder installing block 3203 is firmly connected to a side surface of the I-beam pulley d3201, and the two-way oil cylinder 3204 is fastened to a side surface of the two-way oil cylinder installing block 3203 through a bolt. Two brake block installing plates 3205 are fastened to the two telescopic ends of the two-way oil cylinder 3204, the two brake blocks 3206 are respectively fastened below the two brake block installing plates 3205, and reversing of oil inlet and outlet of the two-way oil cylinder 3204 is controlled through an electromagnetic valve. When high-pressure oil is connected, two ends of the two-way oil cylinder 3204 are retracted, to drive the two brake block installing plates 3205 to approach each other, and the brake blocks 3206 installed on the brake block installing plates 3205 clamp the I-beams c4102 of the standard sections 4100 in the middle of the primary moving beams, and are fastened to the primary moving beams 4000. When the high-pressure oil is disconnected, the two ends of the two-way oil cylinder 3204 extend, to push the two brake block installing plates 3205 to be away from each other, and the brake blocks 3206 installed on the brake block installing plates 3205 loosen the I-beams c4102 of the standard sections 4100 in the middle of the primary moving beams, implementing separation.

When the primary moving beam 4000 needs to move axially, the two-way oil cylinder at an end of the I-beam pulley c2303 is controlled to extend, the brake is loosened, the two-way oil cylinder 3204 of the moving beam connecting mechanism 3200 is retracted, and the moving beam connecting mechanism and the I-beam above the primary moving beam 4000 are locked and fastened. The position above the moving beam connecting mechanism 3200 matches the I-beam below the auxiliary moving beam 3000 through the firmly connected I-beam pulley, and the auxiliary moving beam 3000 can move by a distance along the axis of the primary moving beam 4000. Under the premise that one end of the primary moving beam 4000 is not separated from the sliding trolley, the other end of the entire primary moving beam 4000 extends by a distance outside a square area enclosed by the tower-crane-body-connected support beams 2000. Further, the two-way oil cylinder at an end of the I-beam pulley c2303 is controlled to be retracted, the brake is locked, the primary moving beam 4000 is stuck and fastened, and the hoisting trolley 4300 below the primary moving beam 4000 can move outside the square area to hoist a cargo, resolving a problem that an engineering vehicle cannot enter a construction area and unload the cargo. In addition, when a brake of the moving beam connecting mechanism 3200 is loosened, the auxiliary moving beam 3000 can move along an axis of the primary moving beam 4000. When moving synchronously with a hoisting trolley of the primary moving beam 4000, the auxiliary moving beam 3000 can provide a support force at a bearing position of the primary moving beam 4000, improving a bearing capacity of the primary moving beam 4000, and increasing stability and a hoisting capacity.

The primary moving beam 4000 includes a standard section 4100 in the middle of the primary moving beam, a standard section 4200 at an end of the primary moving beam, and a hoisting trolley 4300. The standard section 4100 in the middle of the primary moving beam is fastened to two ends of the primary moving beam 4000 and includes a steel frame 4101 of the standard section in the middle of the primary moving beam and an I-beam c4102. The steel frame 4101 of the standard section in the middle of the primary moving beam plays a role of bearing and supporting, and the I-beam c4102 is fastened above the steel frame 4101 of the standard section in the middle of the primary moving beam, and matches the I-beam pulley d3201 and the I-beam pulley c2303. A load of the standard section 4100 in the middle of the primary moving beam is transferred to the auxiliary moving beam 3000 and the tower-crane-body-connected support beam 2000. The standard section 4100 in the middle of the primary moving beam can be connected and combined end to end in pairs, and a quantity of the standard sections 4100 in the middle of the primary moving beams is changed based on construction requirements, and then the length of the primary moving beam is changed. The standard section 4200 at an end of the primary moving beam is fastened at both ends of the primary moving beam 4000 and includes a winch b4201 and a standard section steel frame 4202 at an end, with a structure shown in FIG. 21. The winch b4201 is fastened above the steel frame 4202 of the standard section at an end of the primary moving beam, the winch b4201 includes two rope reels that are separately controlled, the hoisting trolley 4300 is pulled by a steel wire rope to move, and lifting/lowering a hook 4303 is controlled. The hoisting trolley 4300 includes a hoisting trolley frame 4301, a pulley block 4302, and a hook 4303, with a structure shown in FIG. 23. The trolley frame 4301 can move along the primary moving beam 4000, the pulley block 4302 is fastened to the trolley frame 4301, and the winch b4201 can cross the pulley block 4302 to control the hook 4303 to rise or fall. The hook 4303 is fastened to a steel wire rope for lifting a heavy object in the winch b4201 and is configured to lift the heavy object.

A support part 5000 is used as a bearing body, a load of an upper tower crane is transferred to the ground through the support part 5000, and four corners of the support part 5000 are respectively installed with a rotary drilling fastening part a7000a, a rotary drilling fastening part b7000b, a rotary drilling fastening part c7000c, and a rotary drilling fastening part d7000d. A diagonal tensioning support part a6000a, a diagonal tensioning support part b6000b, a diagonal tensioning support part c6000c, and a diagonal tensioning support part d6000d are firmly connected to the support part 5000, and the rotary drilling fastening part 7000 uses a spiral bit to drill into the ground, so that an entire device is stabilized on the ground. The above parts are described in detail below.

The support part 5000 includes a long square steel 5100, a threaded adjusting leg 5300, and a steel plate 5200 at the top of the support, and a specific logical connection relationship is as follows.

Figure 26:
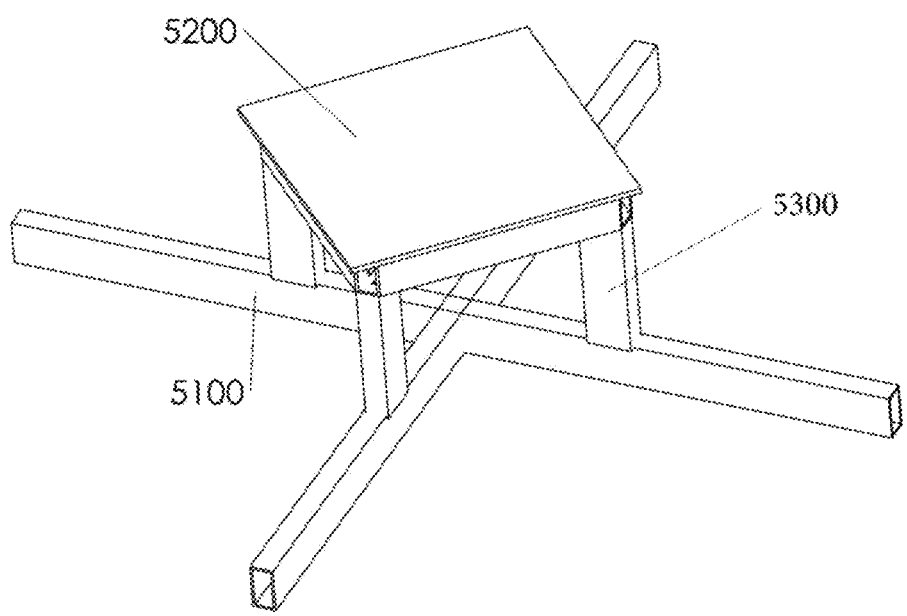
FIG. 26 is a structural diagram of a support part.
Figure 27:
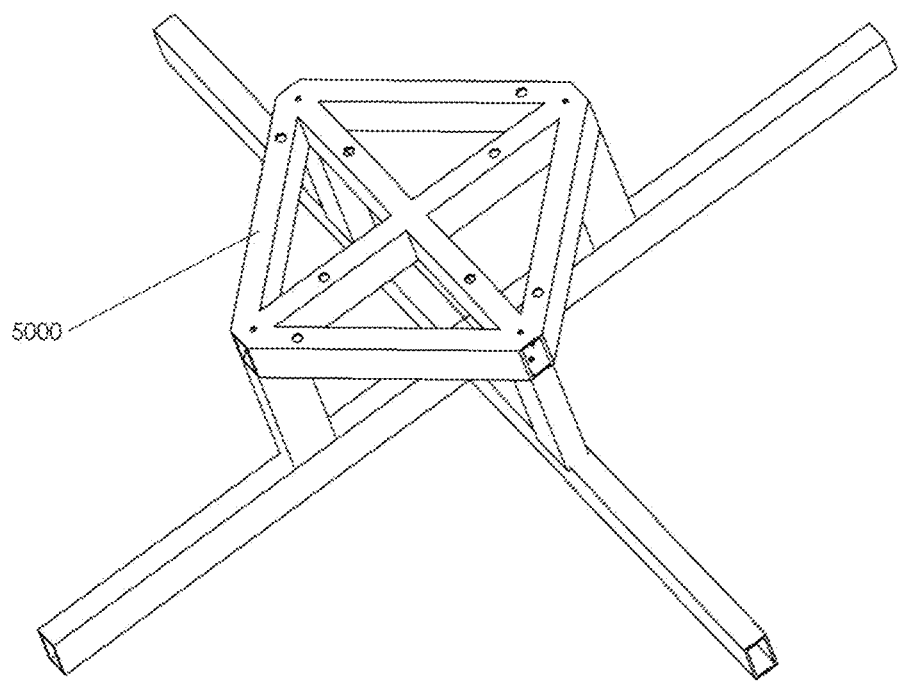
FIG. 27 is a detailed diagram of the support part.
Figure 28:
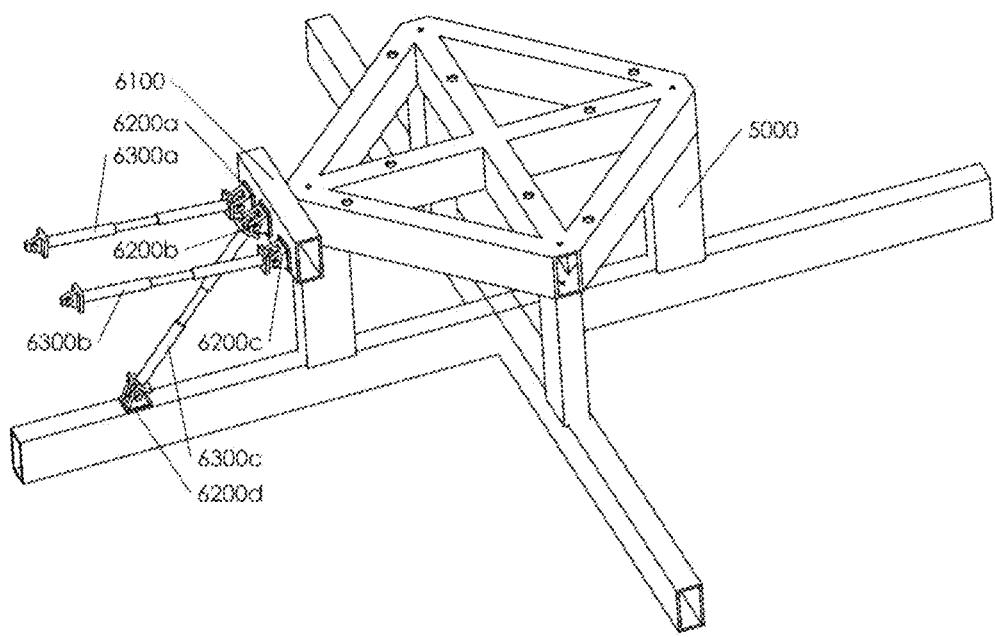
FIG. 28 is a structural diagram of a diagonal tensioning reinforcement part.

A specific structure of the support part 5000 is shown in FIG. 26. Two long square steels 5100 are perpendicular to each other at lower parts, and an end of the long square steel 5100 is configured to firmly connect the rotary drilling fastening part 7000. A relatively long span ensures a good support torque and improves the stability of the device. Short square steels are respectively welded and fastened at four segmented corners, to form bases of the support part 5000. Four short square steels are welded at bases perpendicular to the support part 5000 as vertical columns, and then the square steel is used to weld and fasten upper parts of the four vertical square steels in pairs, to form a square frame above the support part 5000. In addition, at a diagonal position of the square frame above, and a square steel of a proper length is used for welding and reinforcing, to form a three-dimensional steel structure support part 5000. The above square steels are all high-strength special steels, which have good stiffness and a capacity to resist deformation, ensuring that the device has a stable basic structure. A main body of the threaded adjusting leg 5300 is a support rod with a thread, the bottom of the support rod is provided with a bearing steel plate 8232, and the steel plate is perpendicular to the support rod. The steel plate increases an area of an overall bearing capacity of a threaded adjusting leg 5300 above, so that the device is more stable. As shown in a structure of FIG. 25, square steels at the four corners at the bottom of the support part 5000 are provided with installing holes and are fastened to an upper part of the variable angle system bearing steel plate 8232 through bolts. The steel plate 5200 at the top of the support top is fastened to the top of the support part 5000 through a bolt, the steel plate 5200 at the top of the support has a specific thickness and rigidity, and an installing hole corresponding to a conventional tower crane base 1101 is formed therein, so that the tower crane base is easily and firmly installed. During use, the device is first transported to a specified hardened ground, and the height of the four threaded adjusting legs 5300 is adjusted, to ensure that the support part 5000 is in a horizontal state. A counterweight block of a large tonnage is placed in internal space of the support part 5000, to reduce the center of gravity of a tower crane device, and further increase the stability of the tower crane.

The diagonal tensioning support part 6000 includes a short square steel 6100, double-ear-shaped hinged support bases 6200, and threaded diagonal tensioning rods 6300. The double-ear-shaped hinged support bases 6200 include a double-ear-shaped hinged support base a6200a, a double-ear-shaped hinged support base b6200b, a double-ear-shaped double-ear-shaped hinged support base c6200c, and a double-ear-shaped double-ear-shaped hinged support base d6200d. The threaded diagonal tensioning rods 6300 include a threaded diagonal tensioning rod a6300a, a threaded diagonal tensioning rod b6300b, a threaded diagonal tensioning rod c6300c, and a threaded diagonal tensioning rod d6300d. A logical relationship between the threaded diagonal tensioning rods is described in detail below.

The diagonal tensioning support parts 6000 include a diagonal tensioning support part a6000a, a diagonal tensioning support part b6000b, a diagonal tensioning support part c6000c, and a diagonal tensioning support part d6000d, which are respectively located at two ends of the long square steels 5100 and are configured to reinforce the support part 5000 and firmly connected to the rotary drilling fastening part 7000. As shown in a structure in FIG. 28, short square steels 6100 are welded and fastened to upper four corners of the support part 5000. Bases of the double-ear-shaped hinged support base a6200a, the double-ear-shaped hinged support base b6200b, and the double-ear-shaped hinged support base c6200c are welded and fastened to a side surface of the short square steel 6100 respectively, a base of the double-ear-shaped hinged support base d6200d is welded and fastened on the long square steel 5100, two pin holes are provided on the double-ear-shaped hinged support base 6200, which are hinged with a single-ear-shaped hinged base of the threaded diagonal tensioning rod 6300 through pins, to reinforce and connect the support part 5000 and the rotary drilling fastening part 7000.

Figure 29:
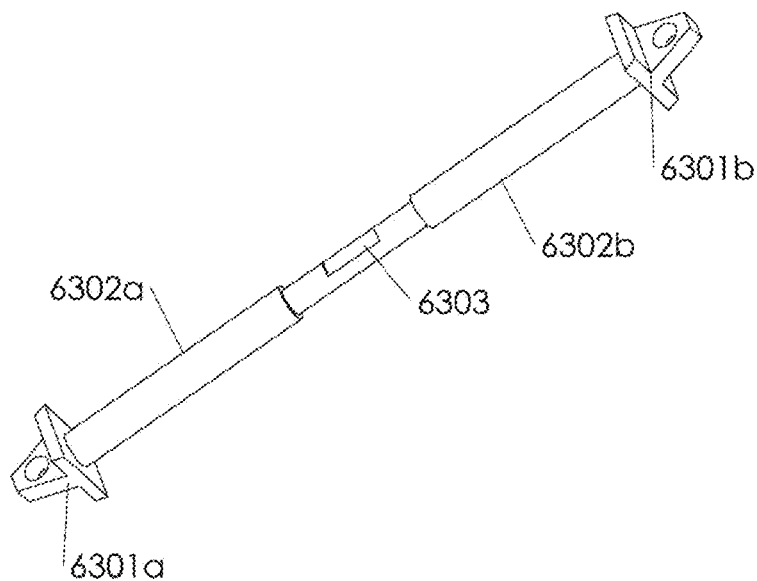
FIG. 29 is a structural diagram of a threaded diagonal tensioning rod.

A structure of the threaded diagonal tensioning rod 6300 is shown in FIG. 29, including a single-ear-shaped hinged base a6301a, a single-ear-shaped hinged base b6301b, an internal threaded sleeve a6302a, an internal threaded sleeve b6302b, and an external threaded rod 6303. The single-ear-shaped hinged base a6301a is provided with a locking pin hole, and a base part is firmly connected to one end of the internal threaded sleeve a6302a. The internal threaded sleeve a6302a is a steel hollow structure with a left-handed internal thread inside. The single-ear-shaped hinged base b6301b is provided with a locking pin hole, and a base part is firmly connected to one end of the internal threaded sleeve b6302b. The internal threaded sleeve b6302b is a steel hollow structure with a right-handed internal thread inside. The external threaded rod 6303 is a solid cylindrical steel rod with threads at both ends, a flat grinding opening is provided in the middle, and external threads at both ends are in a right-handed direction. During installation, the single-ear-shaped hinged base a6301a and the single-ear-shaped hinged base b6301b at both ends are connected to locking pins of the double-ear-shaped hinged base, and the internal threaded sleeve a6302a and the internal threaded sleeve b6302b firmly connected to the single-ear-shaped hinged base a6301a and the single-ear-shaped hinged base b6301b do not rotate around axes. A pipe wrench is used to clamp the flat grinding opening in the middle of the external threaded rod 6303, the external threaded rod 6303 is twisted clockwise or counterclockwise to rotate around an axis, and threads at both ends of the external threaded rod 6303 can be screwed in or out of the internal threaded sleeve a6302a and the internal threaded sleeve b6302b respectively, so that the diagonal tensioning rod 6300 is extended or shortened. One end of the threaded diagonal tensioning rod a6300a is connected to the double-ear-shaped hinged support base a6200a through a locking pin, and the other end is connected to a double-ear-shaped pin base b7102b through a locking pin. One end of the threaded diagonal tensioning rod b6300b is connected to the double-ear-shaped hinged support base c6200c through a locking pin, and the other end is connected to a double-ear-shaped pin base a7102a through a locking pin. One end of the threaded diagonal tensioning rod c6300c is connected to the double-ear-shaped hinged support base b6200b through a locking pin, and the other end is connected to a double-ear-shaped pin base b7102b through a locking pin, which is respectively to tighten and reinforce the support part 5000 and the rotary drilling fastening part 7000.

The rotary drilling fastening part 7000 includes a rotary drilling support part 7100 and a rotary drilling power part 7200. The rotary drilling support part 7100 includes a vertical steel frame 7101, the double-ear-shaped pin base a7102a, the double-ear-shaped pin base b7102b, and a pulley 7103. The rotary drilling power part 7200 includes a speed reducer 7201, a square transmission shaft 7202, an inner square hole sprocket 7203, a motor 7204, a spiral bit 7205, a guide slider 7206, a power transmission box 7207, and a winch 7208. The following is a detailed description of a logical relationship between the above components.

Figure 30:
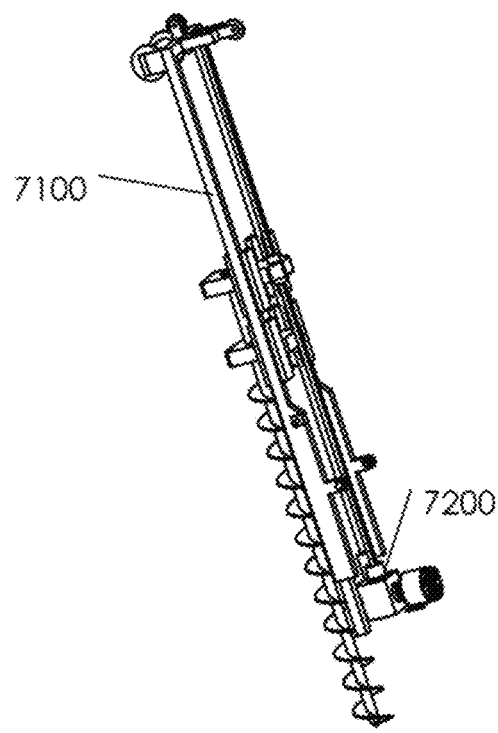
FIG. 30 is a structural diagram of a rotary drilling part.
Figure 32:
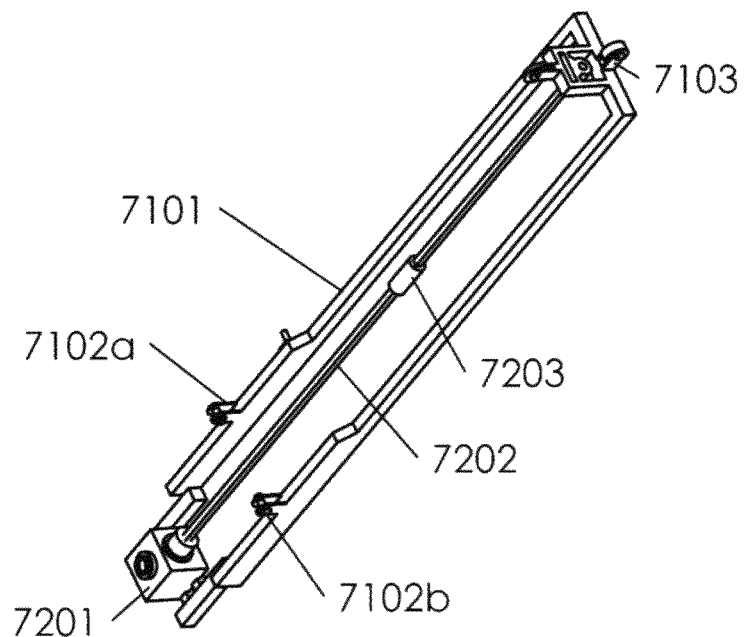
FIG. 32 is a detailed diagram of power transmission of the rotary drilling part.

The rotary drilling fastening parts 7000 include a rotary drilling fastening part a7000a, a rotary drilling fastening part b7000b, a rotary drilling fastening part c7000c, and a rotary drilling fastening part d7000d, which are separately fastened at an end of the long square steel 5100 of the support part 5000. Drilling the ground is performed through the spiral bit 7205, and the spiral bit 7205 can be freely combined and lengthened based on the depth of drilling, and a relatively long spiral bit is punched into the ground to fasten and stabilize the device. The rotary drilling support part 7100 is used as a main bearing structure of the rotary drilling fastening part, as shown in FIG. 30. A structure of the vertical steel frame 7101 is shown in FIG. 32. An upper part is a relatively thin door-shaped frame, which is configured to support, stabilize, and guide the spiral bit 7205 to move up and down. A lower part is a relatively thick door-shaped frame, which is connected to an end of the long square steel 5100 through hinging. The double-ear-shaped pin base a7102a and the double-ear-shaped pin base b7102b are welded and fastened to a side surface of the relatively thick door-shaped frame below, and each of the double-ear-shaped pin base a7102a and the double-ear-shaped pin base b7102b is provided with two pin holes. One end of the threaded diagonal tensioning rod a6300a is connected to the double-ear-shaped hinged support base a6200a through a locking pin, and the other end is connected to the double-ear-shaped pin base b7102b through a locking pin. One end of the threaded diagonal tensioning rod b6300b is connected to the double-ear-shaped hinged support base c6200c through a locking pin, and the other end is connected to the double-ear-shaped pin base a7102a through a locking pin. The threaded diagonal tensioning rod a6300a and the threaded diagonal tensioning rod b6300b hinges and tightens the rotary drilling fastening part 7000 and the support part 5000. The pulley 7103 is fastened above the rotary drilling support part 7100, a steel wire rope on the winch 7208 crosses the pulley 7103 and is firmly connected to the guide slider 7206, and the guide slider 7206 is pulled by the winch 7208 to move up and down, to control entrance and exit of the spiral bit 7205.

Figure 31:
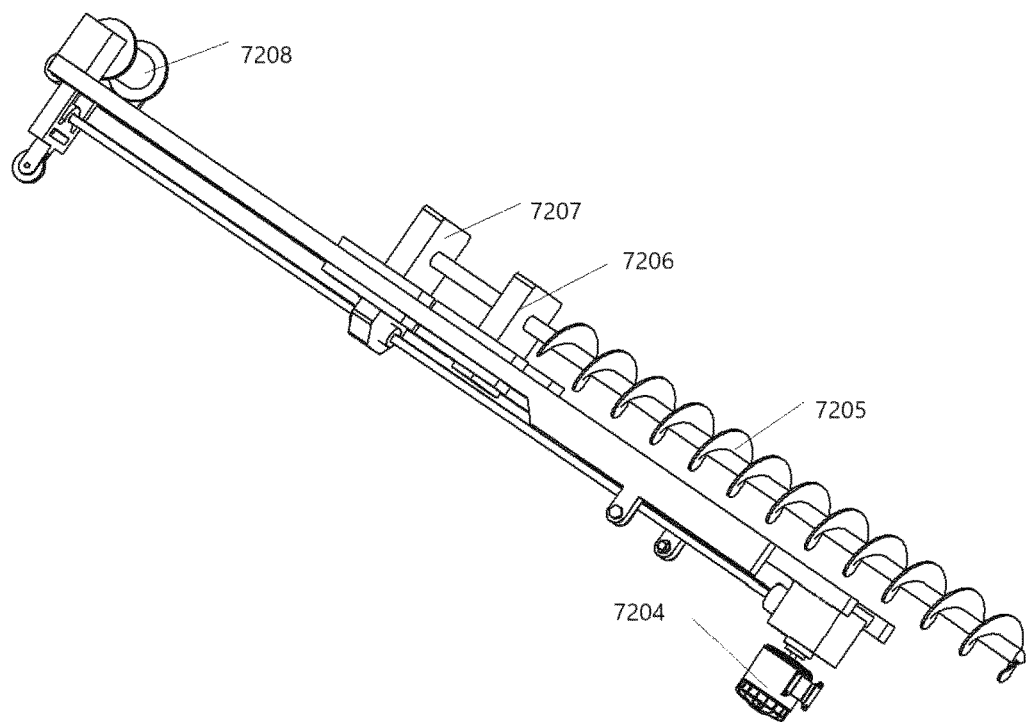
FIG. 31 is a structural diagram of a rotary drilling power part.
Figure 33:
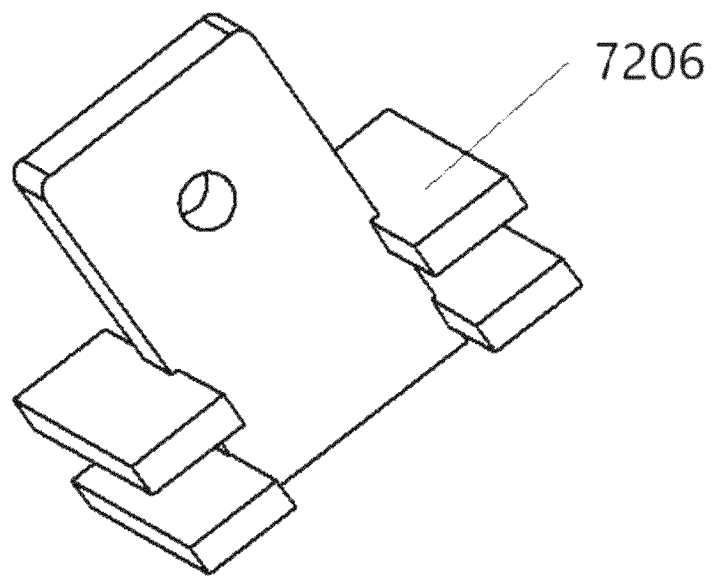
FIG. 33 is a structural diagram of a guide slider.
Figure 34:
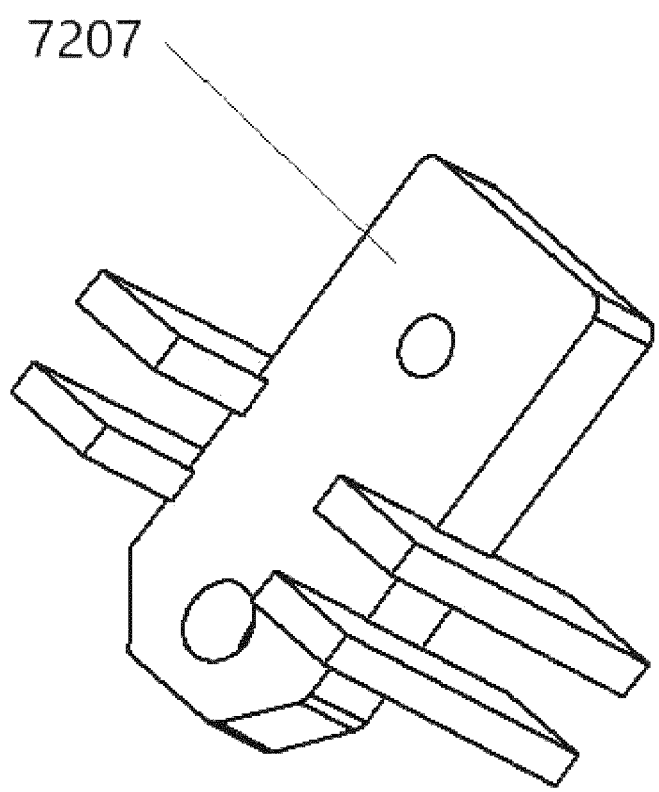
FIG. 34 is a structural diagram of a power transmission box.
Figure 35:
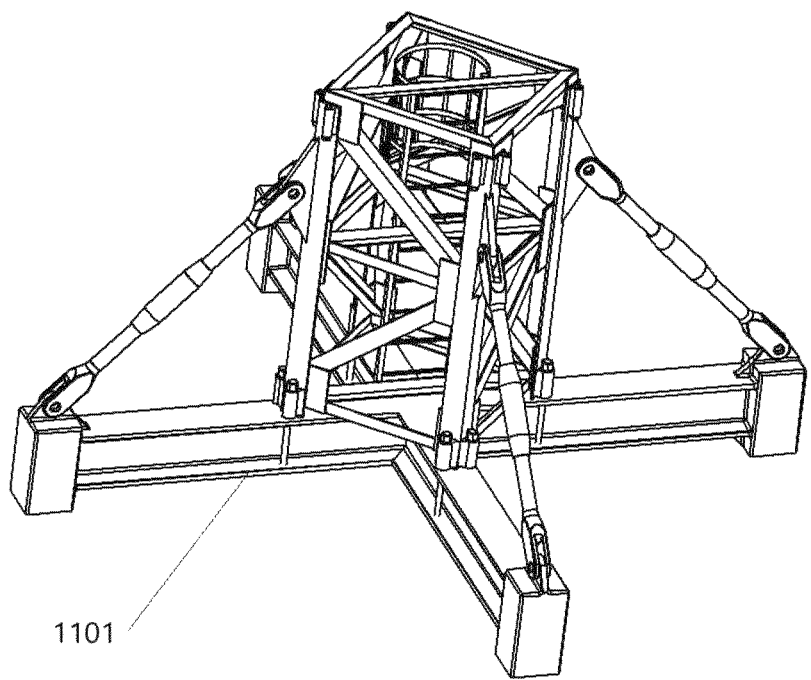
FIG. 35 is a structural diagram of a conventional tower crane base.
Figure 36:
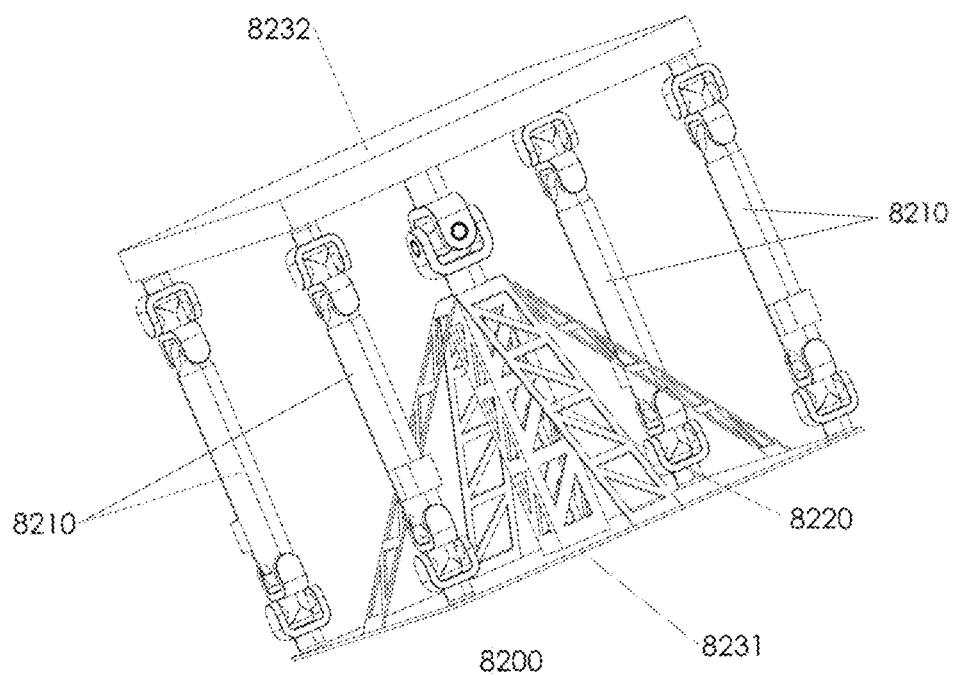
FIG. 36 is a structural diagram of a variable angle bearing system.
Figure 37:
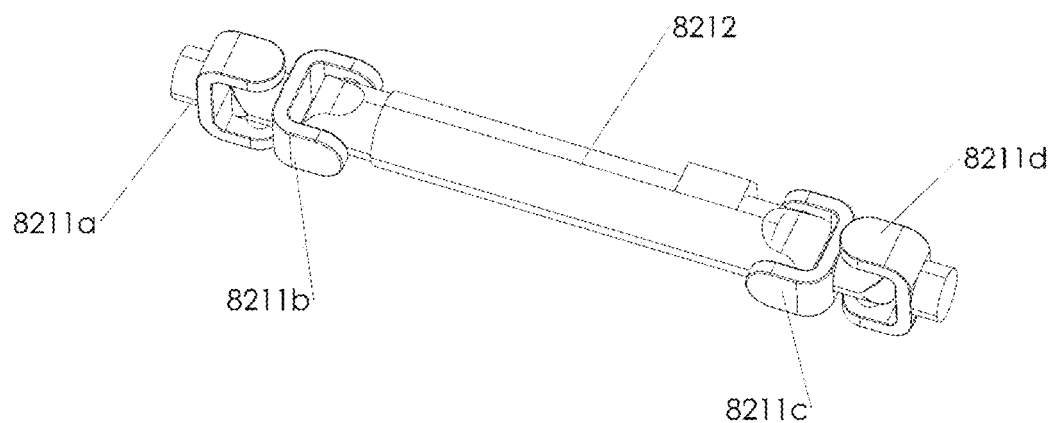
FIG. 37 is a structural diagram of installation of a variable angle oil cylinder.
Figure 38:
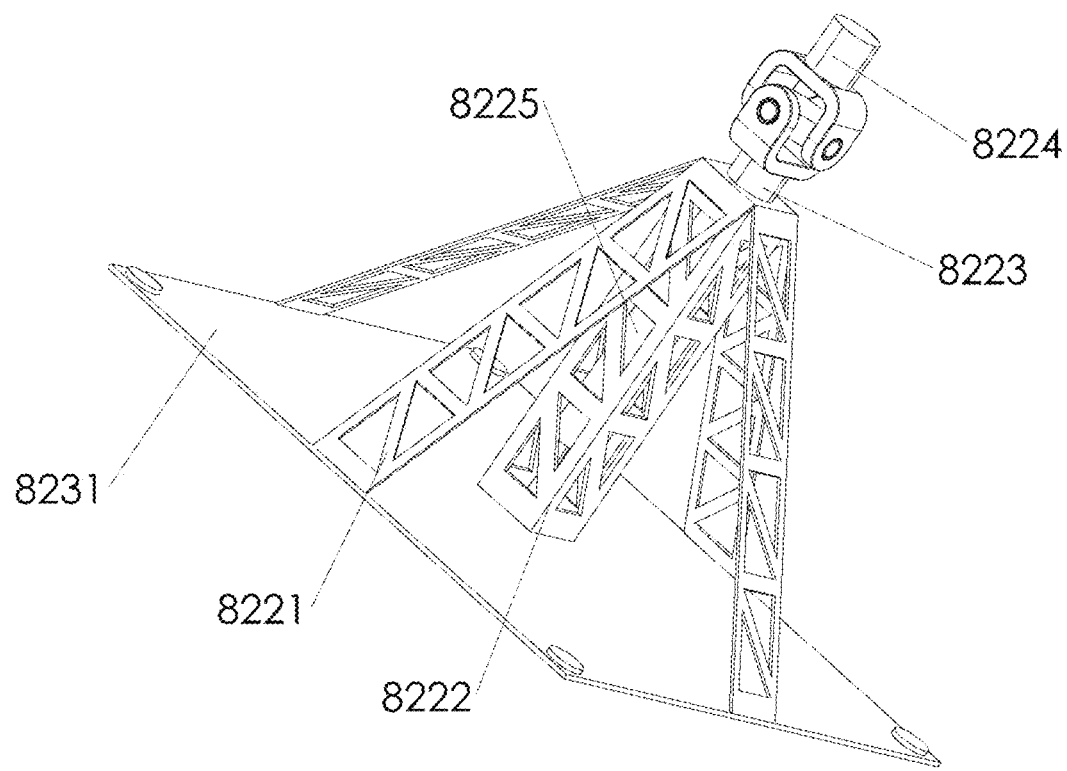
FIG. 38 is a structural diagram of a variable angle bearing oil cylinder.
Figure 39:
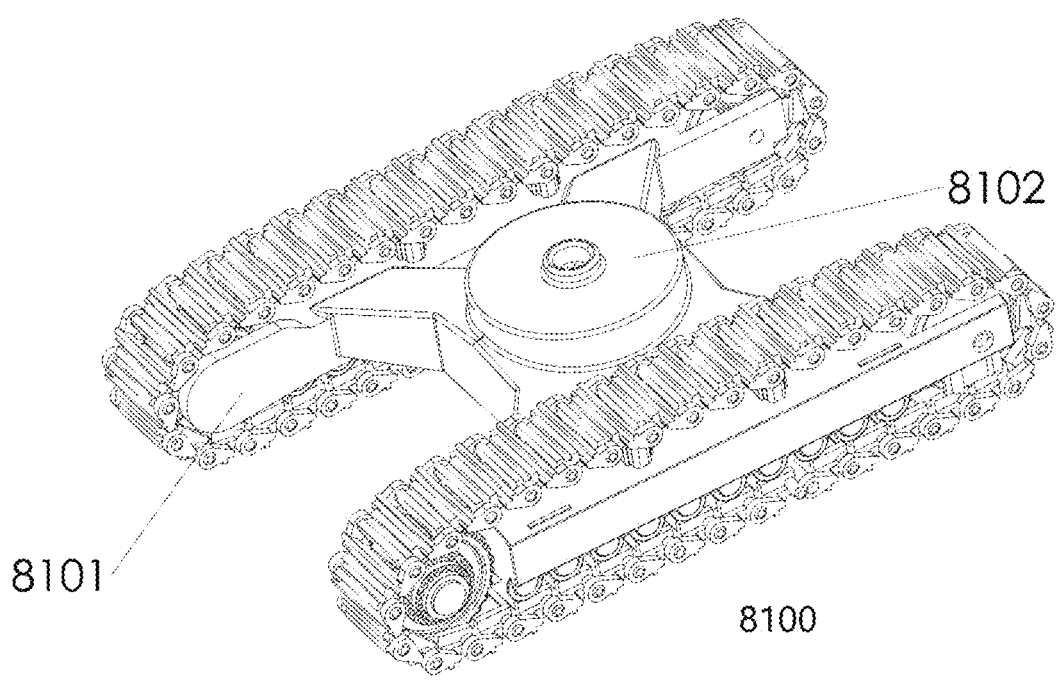
FIG. 39 is a structural diagram of a walking crawler.

The rotary drilling power part 7200 includes a speed reducer 7201, a square transmission shaft 7202, an inner square hole sprocket 7203, a motor 7204, a spiral bit 7205, a guide slider 7206, a power transmission box 7207, and a winch 7208. The speed reducer 7201 is a worm right-angle speed reducer and is fastened at the bottom of the rotary drilling support part 7100. An output end of the speed reducer is connected to the square transmission shaft 7202, to drive the square transmission shaft 7202 to rotate synchronously. The motor 7204 is fastened to a side surface of the speed reducer 7201 through a bolt, and an output shaft of the motor is linked with an input shaft keyway of the speed reducer 7201. The motor 7204 transmits power to the speed reducer 7201, and transmits the power to the square transmission shaft 7202 after deceleration and distance increase. An inner hole of the inner square hole sprocket 7203 is sleeved on the square transmission shaft 7202, which can rotate synchronously with the square transmission shaft 7202 and can move up and down along an axis of the square transmission shaft 7202. A structure of the power transmission box 7207 is shown in FIG. 31. Two ends are provided with grooves that match relatively thin door-shaped frames of the vertical steel frame 7101, so that the power transmission box can move up and down along the vertical steel frame 7101. Two holes are provided in the middle of the power transmission box 7207, and bearings are installed in the holes. The inner square hole sprocket 7203 is in an interference fit with a bearing in a small hole, a transmission shaft of the spiral bit 7205 is provided with a small sprocket through a keyway, and the small sprocket is located inside the power transmission box 7207. In addition, the transmission shaft of the spiral bit 7205 is in an interference fit with a bearing in a large hole in the power transmission box 7207. A small sprocket of the spiral bit 7205 is connected through the inner square hole sprocket 7203 of a chain. Power of the inner square hole sprocket 7203 is transmitted to the spiral bit 7205 through the chain, and the power of the square transmission shaft 7202 is then transmitted to the spiral bit 7205. A structure of the guide slider 7206 is shown in FIG. 33, two ends are provided with grooves that match relatively thin door-shaped frames of the vertical steel frame 7101, so that the guide slider can move up and down along the vertical steel frame 7101. A bearing is installed in an opening in the middle, and the bearing is in an interference fit with the transmission shaft of the spiral bit 7205. The guide slider 7206 can pull the spiral bit 7205 to move up and down along the vertical steel frame 7101, without affecting a rotation process of the spiral bit 7205.

An inner hole of the inner square hole sprocket 7203 is sleeved on the square transmission shaft 7202, which can rotate synchronously with the square transmission shaft 7202 and can move up and down along an axis of the square transmission shaft 7202. The winch 7208 pulls the guide slider 7206 to move up and down and drives the spiral bit 7205 to move up and down along the vertical steel frame 7101, and the power transmission box 7207 moves up and down simultaneously, without affecting power transmission by the square transmission shaft 7202 to the spiral bit 7205. The rotary drilling power part 7200 achieves the following functions: the motor 7204 is started to rotate forward, transmits power to the speed reducer 7201, and transmits the power to the square transmission shaft 7202 after deceleration and distance increase. The inner square hole sprocket 7203 is used to drive the spiral bit 7205 to rotate; the winch 7208 is controlled to pull the guide slider 7206 to move up and down and drive the spiral bit 7205 to move up and down along the vertical steel frame 7101. When the rotary drilling fastening part 7000 works, the spiral bit 7205 drills down into the ground, and the winch 7208 continuously lowers the guide slider 7206 by using the steel wire rope, so that the guide slider moves downward under the gravity of the spiral bit 7205, and then the spiral bit 7205 continuously drills into the ground, implementing deep underground fastening and keeping a device stable. When the tower crane is dismantled, the motor 7204 is started to rotate backward and the spiral bit 7205 rotates backward, the winch 7208 uses the steel wire rope to pull the guide slider 7206 to move upward, and the spiral bit 7205 withdraws from the ground. The device is unfastened, so that the tower crane base can be quickly removed.

The bottom of the rotary drilling fastening part 7000 is provided with two movable chassis 8000 with the same variable platform angle. The movable chassis 8000 with the variable platform angle includes a crawler walking part 8100 and a variable angle system 8200. The crawler walking part 8100 includes crawler power systems 8101 and a lifting oil cylinder 8102. The variable angle system 8200 includes a variable angle oil cylinder 8210, a main bearing oil cylinder 8220, a variable angle system bottom plate 8231, and a variable angle system bearing steel plate 8232.

The crawler walking part 8100, as a bottom layer support part of an entire device, is hydraulically driven to walk. When movable tower crane bases are respectively installed at the bottoms of four tower crane bodies of the hoisting platform, four crawler walking systems cooperate to move synchronously, to move the hoisting platform by a short distance under a load bearing condition. The crawler power system 8101 is a large crawler movable chassis in the market, which has a strong bearing capacity and stability. The lifting oil cylinder 8102 can move up and down when bearing a load above, ensuring that the upper hoisting platform can better adjust a relative position when moving or working, and preventing stress distortion occurring on the hoisting platform caused by an uneven terrain.

Figure 40:
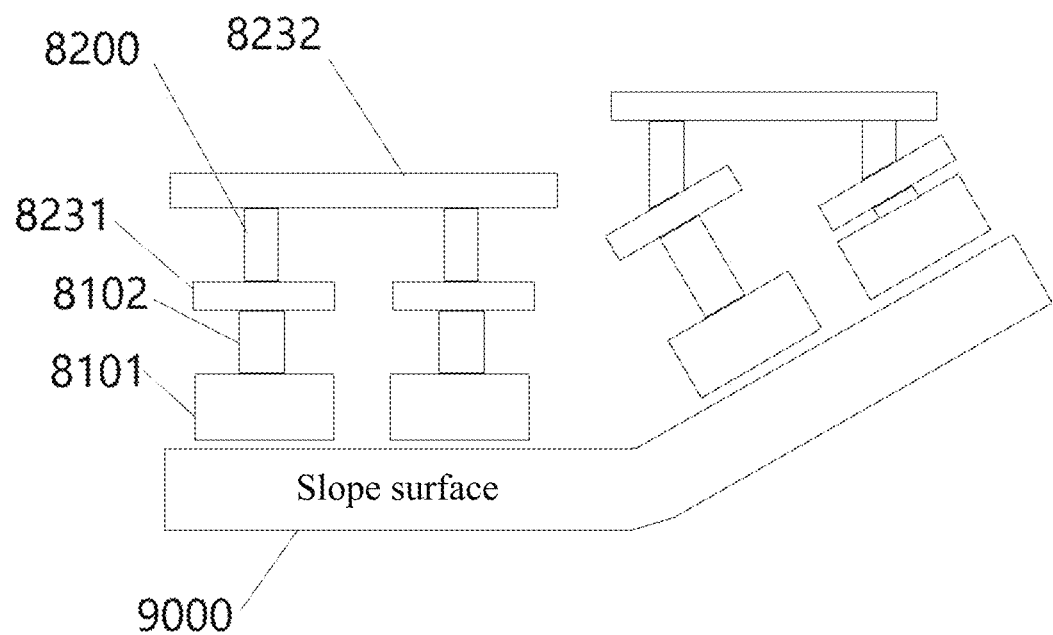
FIG. 40 is a logical block diagram of a climbing structure.

As shown in FIG. 40, a driving state on a slope surface 9000 is as follows: when driving on a horizontal slope surface, lifting oil cylinders 8102 of front and rear crawler walking parts 8100 are lifted by a same height, ensuring that the upper variable angle system bearing steel plate 8232 keeps horizontal, and further keeping the rotary drilling fastening part 7000 horizontal; and when driving on a slope surface, the lifting oil cylinder 8102 of the front crawler walking part 8100 is lowered, the lifting oil cylinder 8102 of the rear crawler walking part 8100 is lifted, and the variable angle system 8200 is controlled to adjust an angle, ensuring that the upper variable angle system bearing steel plate 8232 keeps horizontally, and furthering ensuring stability of the entire device when moving on a slope. When walking on a terrain similar to steps, the lifting oil cylinder 8102 of the rear crawler walking part 8100 can be lifted first, the lifting oil cylinder is moved forward to enable the front crawler walking part 8100 to enter a step, the lifting oil cylinder 8102 of the rear crawler walking part 8100 is lowered, and the lifting oil cylinder is moved forward to enable the rear crawler walking part 8100 to enter a step, so that the entire device completes a step climbing process step by step.

The variable angle system bottom plate 8231 in the variable angle system 8200 is firmly installed on the lifting oil cylinder 8102 of the crawler walking part 8100. When bearing the weight of the upper hoisting platform, a problem that tilting of the hoisting platform can be resolved because a ground where the crawler walking part 8100 is located is uneven. A thread at a tail of a Y-shaped pin head a8211a is fastened below the variable angle system bearing steel plate 8232 through a bolt, a Y-shaped opening of the Y-shaped pin head is connected to a pin hole at a tail of a Y-shaped pin head b8211b through a pin shaft, and a Y-shaped opening of the Y-shaped pin head b8211b is connected to a head of a variable angle servo-hydraulic cylinder 8212 through a pin shaft. A thread at a tail of a Y-shaped pin head d8211d is fastened above the variable angle system bottom plate 8231 through a bolt, a Y-shaped opening of the Y-shaped pin head is connected to a pin hole at a tail of a Y-shaped pin head 8211c through a pin shaft, and a Y-shaped opening of the Y-shaped pin head c8211c is connected to a tail of a variable angle servo-hydraulic cylinder 8212 through a pin shaft. The above four Y-shaped pin heads are hinged, ensuring that the variable angle servo-hydraulic cylinder 8212 does not generate a stress under a non-axial force during extending or retracting, resulting in the damage to the hydraulic cylinder.

A main bearing oil cylinder a8220 includes an inclined support plate 8221, a main support frame 8222, a Y-shaped pin head e8223, a Y-shaped pin head f8224, and a main support servo-hydraulic cylinder 8225. The main support frame 8222 is welded by a steel plate, a lower part is welded and fastened at the center of the variable angle system bottom plate 8231, and an upper part is provided with an installing hole for firmly installing the main support servo-hydraulic cylinder 8225. A cylinder body of the main support servo-hydraulic cylinder 8225 is located inside the main support frame 8222, and a telescopic end thereof is located above the main support frame 8222. A pin hole at a tail of the Y-shaped pin head e8223 is connected to a head of the telescopic end of the main support servo-hydraulic cylinder 8225, a Y-shaped opening thereof is connected to a Y-shaped opening of the Y-shaped pin head f8224 through a pin shaft, and a thread at a tail of the Y-shaped pin head f8224 is fastened below the variable angle system bearing steel plate 8232 through a bolt. The main support servo-hydraulic cylinder 8225 is a large-tonnage oil cylinder, which mainly bears a load above the variable angle system bearing steel plate 8232. An inclination angle sensor is disposed on the variable angle system bearing steel plate 8232 and is configured to detect an angle between the variable angle system bearing steel plate 8232 and a horizontal plane, feed back a signal to a device controller, and control a hydraulic servo system by the controller. Four variable angle servo-hydraulic cylinders 8212 at four corners cooperate with each other to extend or retract, and can adjust an inclination angle between the variable angle system bearing steel plate 8232 and the horizontal plane, ensuring that the hoisting platform above is always in a vertical state. The four inclined support plates 8221 are welded by steel plates, and two ends are welded and fastened on a center of four sides of the variable angle system bottom plate 8231 and top four sides of the main support frame 8222 respectively.

A specific working principle is described below.

(1) During use, movement to a specified hardened ground is performed using the crawler walking system, to ensure that the support part 5000 is in a horizontal state. A counterweight block of a large tonnage is placed in internal space of the support part 5000, to reduce the center of gravity of a tower crane device, and further increasing the stability of the tower crane.

(2) The diagonal tensioning support part 6000 is connected, the single-ear-shaped hinged base a6301a and the single-ear-shaped hinged base b6301b are connected to locking pins of the double-ear-shaped hinged base, and the internal threaded sleeves a6302a firmly connected to the single-ear-shaped hinged base a6301a and the single-ear-shaped hinged base b6301b do not rotate around axes. A pipe wrench is used to clamp the flat grinding opening in the middle of the external threaded rod 6303, the external threaded rod 6303 is twisted clockwise or counterclockwise to rotate around an axis, and threads at both ends of the external threaded rod 6303 can be screwed in or out of the internal threaded sleeve a6302a and the internal threaded sleeve b6302b respectively, so that the diagonal tensioning rod 6300 is extended or shortened. One end of the threaded diagonal tensioning rod a6300a is connected to the double-ear-shaped hinged support base a6200a through a locking pin, and the other end is connected to a double-ear-shaped pin base b7102b through a locking pin. One end of the threaded diagonal tensioning rod b6300b is connected to the double-ear-shaped hinged support base c6200c through a locking pin, and the other end is connected to a double-ear-shaped pin base a7102a through a locking pin. One end of the threaded diagonal tensioning rod c6300c is connected to the double-ear-shaped hinged support base b6200b through a locking pin, and the other end is connected to a double-ear-shaped pin base b7102b through a locking pin, which is respectively to tighten and reinforce the support part 5000 and the rotary drilling fastening part 7000.

(3) The rotary drilling fastening part a7000a, the rotary drilling fastening part b7000b, the rotary drilling fastening part c7000c, and the rotary drilling fastening part d7000d are separately fastened at ends of the long square steel 5100 of the support part 5000 and are connected and reinforced to the support through a diagonal tensioning support rod. During use, the motor 7204 is started to rotate forward, transmits power to the speed reducer 7201, and transmits the power to the square transmission shaft 7202 after deceleration and distance increase. The inner square hole sprocket 7203 is used to drive the spiral bit 7205 to rotate; the winch 7208 is controlled to pull the guide slider 7206 to move up and down and drive the spiral bit 7205 to move up and down along the vertical steel frame 7101. When the rotary drilling fastening part 7000 works, the spiral bit 7205 drills down into the ground, and the winch 7208 pulls the guide slider 7206 to move downward by using the steel wire rope, and the spiral bit 7205 continuously drills into the ground, implementing deep underground fastening, and keeping a device stable. When the tower crane is dismantled, the motor 7204 is started to rotate backward and the spiral bit 7205 rotates backward, the winch 7208 uses the steel wire rope to pull the guide slider 7206 to move upward, and the spiral bit 7205 withdraws from the ground. The device is unfastened, so that the tower crane base can be quickly removed.

(4) After the device is fastened, the conventional tower crane base 1101 is fastened above the steel plate 5200 at the top of the support.

The working principle of the multi-tower linkage type aerial hoisting platform of the present invention is introduced below with reference to FIG. 1 to FIG. 41 and in combination with the description of the above structural technical features. The specific working principle of the device is described below.

(1) A working principle of the self-climbing lifting/lowering system 1200 is as follows.

The tower crane body lifting/lowering part 1000 is the self-climbing lifting/lowering system fastened to a tower crane body, and can automatically complete lifting/lowering along the tower crane body by using the tower crane body with standard sections as a support and the hydraulic cylinder as a lifting/lowering force, and in combination with the pneumatic locking mechanism. Lifting/lowering parts of the four tower crane bodies are firmly placed at four corners of the building, forming a rectangle through enclosure. Climbing: in an initial state, when the locking system b1221 is firmly connected to the I-beam standard support 1201 through the locking push rod, the short hydraulic cylinder is controlled to pull the locking push rod of the locking system a1210 to rotate 90 degrees in an opposite direction, a cross beam of the I-beam standard support 1201 is loosened, and the locking system a1210 is separated from the I-beam standard support 1201. When telescopic rods of the two long hydraulic cylinders 1226 extend, a lower length of the I-beam a1202 is relatively long, so that two I-beams a1202 can be pushed to move upward, then steel plates 1203 fastened to the two I-beams and a locking system a1210 are driven to move upward, and the locking system b1221 moves relative to the I-beam a1202 through the I-beam pulley b1222. When the telescopic rods of the two long hydraulic cylinders 1226 fully extend to a maximum position, the locking system a1210 reaches a highest position of climbing and is firmly connected to the I-beam standard support 1201 through the locking push rod; and the self-climbing lifting/lowering system 1200 is lifted by a height of a standard section and is firmly connected to the I-beam standard support 1201. Further, the short hydraulic cylinder is controlled to pull the locking push rod of the locking system b1221 to rotate 90 degrees in an opposite direction, the cross beam of the I-beam standard support 1201 is loosened, the telescopic rods of the two long hydraulic cylinders 1226 retracts fully to pull the locking system b1221 to move upward, and the I-beam pulley b1222 fastened to the locking system b1221 moves upward along the I-beam a1202. When the I-beam pulley b1222 moves to a maximum position, the locking system b1221 is clamped into the cross beam of the I-beam standard support 1201 through the locking push rod, implementing a fastened connection. When the self-climbing lifting/lowering system 1200 continuously climbs, repeat the above actions for climbing step by step along the tower crane body. After the self-climbing lifting/lowering system 1200 climbs to a specified position, the locking system a1210 and the locking system b1221 are firmly connected to the I-beam standard support 1201 through the locking push rod, to ensure stability of the hoisting platform and a tower crane body structure.

Descending: the short hydraulic cylinder is controlled to pull the locking push rod of the locking system b1221 to rotate 90 degrees in an opposite direction, the cross beam of the I-beam standard support 1201 is loosened, the telescopic rods of the two long hydraulic cylinders 1226 extend fully to push the locking system b1221 to move downward, and the I-beam pulley b1222 fastened to the locking system b1221 moves downward along the I-beam a1202. When the I-beam pulley b1222 moves to a maximum position, the locking system b1221 is clamped into the cross beam of the I-beam standard support 1201 through the locking push rod, implementing a fastened connection. Further, the short hydraulic cylinder is controlled to pull the locking push rod of the locking system a1210 to rotate 90 degrees in an opposite direction, the cross beam of the I-beam standard support 1201 is loosened, and the locking system a1210 is separated from the I-beam standard support 1201. When telescopic rods of the two long hydraulic cylinders 1226 are controlled to retract, the two I-beams a1202 can be pulled to move downward, and then steel plates 1203 fastened thereto and the locking system a1210 are driven to move downward. The locking system b1221 moves relative to the I-beam a1202 through the I-beam pulley b1222. When the telescopic rods of the two long hydraulic cylinders 1226 are completely retracted, the locking system a1210 is lowered to a lowest position and is firmly connected to the I-beam standard support 1201 through the locking push rod. The self-climbing lifting/lowering system 1200 is lowered by a height of a standard section and is firmly connected to the I-beam standard support 1201. When the self-climbing lifting/lowering system 1200 is continuously lowered in detail, repeat the above actions for lowering step by step along the tower crane body. After the self-climbing lifting/lowering system 1200 is lowered to a specified position, the locking system a1210 and the locking system b1221 are firmly connected to the I-beam standard support 1201 through the locking push rod, to ensure stability of the hoisting platform and a tower crane body structure.

(2) A working principle of the tower-crane-body-connected support beam 2000

Two ends of the tower-crane-body-connected support beam 2000 are connected to the tower crane body lifting/lowering part 1000 through three hinged bases, and are configured to connect two adjacent tower crane body lifting/lowering parts 1000, to stabilize the tower crane body and provide the effect of a sliding track and bearing support for the primary moving beam 4000 and the auxiliary moving beam 3000 simultaneously. Steel wire winches are installed on standard sections at two ends of each tower-crane-body-connected support beam 2000, and sliding trolleys are provided below the standard sections, with a specific structure shown in FIG. 16. The steel wire winches can pull the sliding trolleys to move along the tower-crane-body-connected support beam 2000. The tower-crane-body-connected support beams 2000 include: a tower-crane-body-connected support beam 2000a, connected between a tower crane body lifting/lowering part 1000a and a tower crane body lifting/lowering part 1000d; a tower-crane-body-connected support beam 2000b, connected between the tower crane body lifting/lowering part 1000a and a tower crane body lifting/lowering part 1000b; a tower-crane-body-connected support beam 2000c, connected between the tower crane body lifting/lowering part 1000b and a tower crane body lifting/lowering part 1000c; and a tower-crane-body-connected support beam 2000d, connected between the tower crane body lifting/lowering part 1000c and the tower crane body lifting/lowering part 1000d.

(3) Working principles of the auxiliary moving beam 3000 and the primary moving beam 4000

The auxiliary moving beam 3000 and the primary moving beam 4000 are vertical to each other, I-beams are installed below the auxiliary moving beam 3000 and above the primary moving beam 4000, which are connected by a moving beam connecting mechanism 3200. A specific structure of the moving beam connecting mechanism is shown in FIG. 20. When a two-way cylinder extends, a position below the moving beam connecting mechanism 3200 matches an I-beam above the primary moving beam 4000 through an I-beam pulley. A position above the moving beam connecting mechanism 3200 matches an I-beam below the auxiliary moving beam 3000 through an I-beam pulley, and the auxiliary moving beam 3000 can move along an axis of the primary moving beam 4000. When moving synchronously with a hoisting trolley for the primary moving beam 4000, the auxiliary moving beam 3000 can provide a support force at a bearing position of the primary moving beam 4000, improving a bearing capacity of the primary moving beam 4000 and increasing stability and a hoisting capacity. When the primary moving beam 4000 needs to move axially, a two-way oil cylinder at an end of an I-beam pulley c2303 is controlled to extend, a brake is loosened, a two-way oil cylinder is retracted, and the I-beam above the moving beam connecting mechanism 3200 and the I-beam above the primary moving beam 4000 are locked and fastened. The position above the moving beam connecting mechanism 3200 matches the I-beam below the auxiliary moving beam 3000 through the fastened I-beam pulley, and the auxiliary moving beam 3000 can move by a distance along the axis of the primary moving beam 4000. Under the premise that one end of the primary moving beam 4000 is not separated from the sliding trolley, the other end of the entire primary moving beam 4000 extends by a distance e outside an area enclosed by the tower-crane-body-connected support beams 2000. Further, the two-way oil cylinder at an end of the I-beam pulley c2303 is controlled to be retracted, the brake is locked, the primary moving beam 4000 is stuck and fastened, and the hoisting trolley below the primary moving beam 4000 can move outside the square area to hoist a cargo, resolving a problem that an engineering vehicle cannot enter a construction area and unload the cargo.

(4) During use of a variable angle movable chassis, movement to a specified hardened ground is performed using the crawler walking system, to ensure that the support part 5000 is in a horizontal state. A counterweight block of a large tonnage is placed in internal space of the support part 5000, to reduce the center of gravity of a tower crane device, and further increase the stability of the tower crane. The crawler walking part 8100, as a bottom layer support part of an entire device, is hydraulically driven to walk. When movable tower crane bases are respectively installed at the bottoms of four tower crane bodies of the hoisting platform, four crawler walking systems cooperate to move synchronously, to move the hoisting platform by a short distance under a load bearing condition. The crawler power system 8101 is a large crawler movable chassis in the market, which has a strong bearing capacity and stability. The lifting oil cylinder 8102 can rotate when bearing a load above, and the hydraulic servo variable angle platform ensures that the tower crane body is always in a vertical state, ensuring that the upper hoisting platform can better adjust a relative position when moving or working, and preventing stress distortion occurring on the hoisting platform caused by uneven terrain. A driving state on a slope surface 9000 is as follows: when driving on a horizontal slope surface, lifting oil cylinders 8102 of front and rear crawler walking parts 8100 are lifted by a same height, ensuring that the upper variable angle system bearing steel plate 8232 keeps horizontal, and further keeping the rotary drilling fastening part 7000 horizontal; and when driving on a slope surface, the lifting oil cylinder 8102 of the front crawler walking part 8100 is lowered, the lifting oil cylinder 8102 of the rear crawler walking part 8100 is lifted, and the variable angle system 8200 is controlled to adjust an angle, ensuring that the upper variable angle system bearing steel plate 8232 keeps horizontally, and furthering ensuring stability of the entire device when moving on a slope. When walking on a terrain similar to steps, the lifting oil cylinder 8102 of the rear crawler walking part 8100 can be lifted first, the lifting oil cylinder is moved forward to enable the front crawler walking part 8100 to enter a step, the lifting oil cylinder 8102 of the rear crawler walking part 8100 is lowered, and the lifting oil cylinder is moved forward to enable the rear crawler walking part 8100 to enter a step, so that the entire device completes a step climbing process step by step.

(5) The diagonal tensioning support part 6000 is connected, the single-ear-shaped hinged base a6301a and the single-ear-shaped hinged base b6301b are connected to locking pins of the double-ear-shaped hinged base, and the internal threaded sleeves a6302a firmly connected to the single-ear-shaped hinged base a6301a and the single-ear-shaped hinged base b6301b do not rotate around axes. A pipe wrench is used to clamp the flat grinding opening in the middle of the external threaded rod 6303, the external threaded rod 6303 is twisted clockwise or counterclockwise to rotate around an axis, and threads at both ends of the external threaded rod 6303 can be screwed in or out of the internal threaded sleeve a6302a and the internal threaded sleeve b6302b respectively, so that the diagonal tensioning rod 6300 is extended or shortened. One end of the threaded diagonal tensioning rod a6300a is connected to the double-ear-shaped hinged support base a6200a through a locking pin, and the other end is connected to a double-ear-shaped pin base b7102b through a locking pin. One end of the threaded diagonal tensioning rod b6300b is connected to the double-ear-shaped hinged support base c6200c through a locking pin, and the other end is connected to a double-ear-shaped pin base a7102a through a locking pin. One end of the threaded diagonal tensioning rod c6300c is connected to the double-ear-shaped hinged support base b6200b through a locking pin, and the other end is connected to a double-ear-shaped pin base b7102b through a locking pin, which is respectively to tighten and reinforce the support part 5000 and the rotary drilling fastening part 7000.

(6) The rotary drilling fastening part a7000a, the rotary drilling fastening part b7000b, the rotary drilling fastening part c7000c, and the rotary drilling fastening part d7000d are separately fastened at ends of the long square steel 5100 of the support part 5000 and are connected and reinforced to the support through a diagonal tensioning support rod. During use, the motor 7204 is started to rotate forward, transmits power to the speed reducer 7201, and transmits the power to the square transmission shaft 7202 after deceleration and distance increase. The inner square hole sprocket 7203 is used to drive the spiral bit 7205 to rotate; the winch 7208 is controlled to pull the guide slider 7206 to move up and down and drive the spiral bit 7205 to move up and down along the vertical steel frame 7101. When the rotary drilling fastening part 7000 works, the spiral bit 7205 drills down into the ground, and the winch 7208 pulls the guide slider 7206 to move downward by using the steel wire rope, and the spiral bit 7205 continuously drills into the ground, implementing deep underground fastening, and keeping a device stable. When the tower crane is dismantled, the motor 7204 is started to rotate backward and the spiral bit 7205 rotates backward, the winch 7208 uses the steel wire rope to pull the guide slider 7206 to move upward, and the spiral bit 7205 withdraws from the ground. The device is unfastened, so that the tower crane base can be quickly removed.

(7) After a variable angle movable base is fastened, the tower crane body of the hoisting platform is firmly connected to the tower crane base 1101 through a bolt, and the hoisting platform is built at a low place. The conventional tower crane base 1101 is fastened above the steel plate 5200 at the top of the support.

The above is only specific implementations of the present invention, but the scope of protection of the present invention is not limited thereto. Any change or substitution that can be understood by any person skilled in the art within the scope of the technologies disclosed in the utility model should be covered within the scope of the present invention.

What is claimed is:

1. A multi-tower linkage type aerial hoisting platform, comprising:
   four tower crane body lifting/lowering parts respectively disposed in an outer periphery of a building to form a rectangle through enclosure, and comprising a tower crane body and a self-climbing lifting/lowering system that is capable of climbing or descending step by step along the tower crane body;
   four tower-crane-body-connected support beams, respectively disposed on two opposite self-climbing lifting/lowering systems, wherein a hoisting platform enclosed by the tower-crane-body-connected support beams is driven by the self-climbing lifting/lowering systems to move up and down synchronously;
   auxiliary moving beams, slidably disposed below two opposite tower-crane-body-connected support beams;
   primary moving beams, located below the auxiliary moving beams and relatively perpendicular to the auxiliary moving beams, and slidably disposed below other two opposite tower-crane-body-connected support beams, wherein two ends thereof extend out of a frame enclosed by the four tower-crane-body-connected support beams, and lower ends thereof are slidably provided with hoisting trolleys;
   four movable tower crane bases, respectively disposed at lower ends of the four tower crane body lifting/lowering parts, comprising movable chassis that are used as movable supports with a variable platform angle and support parts disposed on the movable chassis, wherein four corners of the support parts are respectively provided with rotary drilling fastening parts;
   lower ends of the auxiliary moving beams and upper ends of the primary moving beams are connected through moving beam connecting mechanisms, and the auxiliary moving beams are controlled by the moving beam connecting mechanisms to drive the primary moving beams to move along axes of the primary moving beams;
   the self-climbing lifting/lowering system comprises a plurality of I-beam standard supports that are spliced and installed along a side surface of the tower crane body and locking systems a and climbing systems disposed on the I-beam standard supports,
   two I-beams a are connected through a square steel a and a square steel b, and a formed I-beam track matches four I-beam pulleys b provided for the climbing system;
   a lower part of a steel plate is connected to the I-beam a, and an upper part of the steel plate is connected to the locking system a;

the steel plate is provided with a plurality of hinged bases, and three hinged bases located at the lower part are configured to hinge and fasten standard sections at an end of the support beam;

the locking system a comprises a locking system support, the locking system support is a square frame welded by a high-strength steel, the four I-beam pulleys a are disposed at four corner sides of the locking system support, and the four I-beam pulleys a match an I-beam track of the I-beam standard support;

four support bearings are disposed at the bottoms of the four corners of the locking system support and are configured to support and restrain a rotating shaft a and a rotating shaft b;

two ends of the rotating shaft a and two ends of the rotating shaft b are respectively connected to the four support bearings, and two ends inward are connected to a locking push rod a and a locking push rod b respectively, irregular parts provided for two ends of the locking push rod a and the locking push rod b are respectively provided with openings, and the openings are used for clamping cross beams between the I-beam standard supports;

a middle of the rotating shaft a is provided with two connecting rods, the two connecting rods are connected to heads of two short hydraulic cylinder Y-shaped joints, tails of the two short hydraulic cylinder Y-shaped joints are connected to heads of telescopic rods of two short hydraulic cylinders, and the tails of the short hydraulic cylinders are hinged with cross beams of the locking system support through a short hydraulic cylinder hinged base;

the climbing system further comprises a locking system b, the four I-beam pulleys b are connected to upper parts of four I-beam pulleys of the locking system b, and the four I-beam pulleys b match the I-beams a and are configured to move along axes of the I-beams a; and two long hydraulic cylinder hinged bases a are disposed on a side surface of the square steel a, long hydraulic cylinder hinged bases b are disposed on a side surface of a support cross beam of the locking system b, cylinder body tails of two long hydraulic cylinders are connected to the two long hydraulic cylinder hinged bases b respectively, heads of telescopic ends of the two long hydraulic cylinders are connected to tails of two long hydraulic cylinder Y-shaped joints respectively, and heads of the two long hydraulic cylinder Y-shaped joints are connected to the long hydraulic cylinder hinged bases a respectively.

2. The multi-tower linkage type aerial hoisting platform according to claim 1, wherein two ends of the auxiliary moving beam are respectively connected to sliding trolleys provided for lower ends of two opposite tower-crane-body-connected support beams respectively, and the sliding trolleys are configured to drive the auxiliary moving beams to move along axis directions of the tower-crane-body-connected support beams; and two ends of the primary moving beam are respectively connected to sliding trolleys provided for lower ends of two opposite tower-crane-body-connected support beams, and the sliding trolleys are configured to drive the primary moving beams to move along axis directions of the tower-crane-body-connected support beams.

3. The multi-tower linkage type aerial hoisting platform according to claim 1, wherein each of the support parts comprises two long square steels that are perpendicular to each other, and ends of the long square steels are configured to firmly connect the rotary drilling fastening parts;

upper ends of the two long square steels are provided with four short square steels, and upper parts of the four short square steels are fastened in pairs through square steels to form a square frame, and square steels are disposed at a diagonal position of the square frame for reinforcement; and a steel plate is fastened to a top of each of the support parts through a bolt.

4. The multi-tower linkage type aerial hoisting platform according to claim 1, wherein the movable chassis comprises a crawler walking part and a variable angle system, and the crawler walking part comprises crawler power systems and a lifting oil cylinder between the crawler power systems; and the variable angle system comprises a variable angle system bottom plate disposed at an upper end of the lifting oil cylinder, a plurality of variable angle oil cylinders that are uniformly distributed at an upper end of the variable angle system bottom plate, and a variable angle system bearing steel plate disposed at an upper end of the variable angle oil cylinder, and is located between the plurality of variable angle oil cylinders, and a main bearing oil cylinder is disposed between the variable angle system bottom plate and the variable angle system bearing steel plate.

5. The multi-tower linkage type aerial hoisting platform according to claim 4, wherein a diagonal tensioning support part is disposed between each of the support parts and each of the rotary drilling fastening parts, and the diagonal tensioning support part comprises three groups of threaded diagonal tensioning rods; and one end of each of the three groups of threaded diagonal tensioning rods is hinged with an upper part of a corresponding support part of the support parts, wherein the other ends of two groups of the threaded diagonal tensioning rods on two sides are hinged with a vertical steel frame, and the other end of one group of the threaded diagonal tensioning rods in the middle is hinged with a long square steel.

6. A multi-tower linkage type aerial hoisting platform, comprising:

four tower crane body lifting/lowering parts respectively disposed in an outer periphery of a building to form a rectangle through enclosure, and comprising a tower crane body and a self-climbing lifting/lowering system that is capable of climbing or descending step by step along the tower crane body;

four tower-crane-body-connected support beams, respectively disposed on two opposite self-climbing lifting/lowering systems, wherein a hoisting platform enclosed by the tower-crane-body-connected support beams is driven by the self-climbing lifting/lowering systems to move up and down synchronously;

auxiliary moving beams, slidably disposed below two opposite tower-crane-body-connected support beams;

primary moving beams, located below the auxiliary moving beams and relatively perpendicular to the auxiliary moving beams, and slidably disposed below other two opposite tower-crane-body-connected support beams, wherein two ends thereof extend out of a frame enclosed by the four tower-crane-body-connected support beams, and lower ends thereof are slidably provided with hoisting trolleys; and four movable tower crane bases, respectively disposed at lower ends of the four tower crane body lifting/lowering parts, comprising movable chassis that are used as movable supports with a variable platform angle and support parts disposed on the movable chassis, wherein four corners of the support parts are respectively provided with rotary drilling fastening parts;

lower ends of the auxiliary moving beams and upper ends of the primary moving beams are connected through moving beam connecting mechanisms, and the auxiliary moving beams are controlled by the moving beam connecting mechanisms to drive the primary moving beams to move along axes of the primary moving beams;

each of the support parts comprises two long square steels that are perpendicular to each other, and ends of the long square steels are configured to firmly connect the rotary drilling fastening parts;

upper ends of the two long square steels are provided with four short square steels, and upper parts of the four short square steels are fastened in pairs through square steels to form a square frame, and square steels are disposed at a diagonal position of the square frame for reinforcement;

a steel plate is fastened to a top of each of the support parts through a bolt;

the rotary drilling fastening part comprises a rotary drilling support part and a rotary drilling power part disposed on the rotary drilling support part; the rotary drilling support part comprises a vertical steel frame, a relatively thin door-shaped frame is provided above the vertical steel frame and is configured to support and guide a spiral bit to move up and down; an upper end of the vertical steel frame is provided with a pulley;

the rotary drilling power part comprises a winch disposed at an upper end of the vertical steel frame, a power transmission box and a guide slider slidably disposed on the vertical steel frame in sequence, and a speed reducer disposed at a lower end of the vertical steel frame, an output end of the speed reducer is connected to a square transmission shaft, and the other end of the square transmission shaft is connected to the upper end of the vertical steel frame; a side surface of the speed reducer is provided with a motor; and the square transmission shaft is sleeved with an inner square hole sprocket; and the winch is configured to pull the guide slider to move up and down, and then entrance and exit of the spiral bit are controlled.

7. A multi-tower linkage type aerial hoisting platform, comprising:

four tower crane body lifting/lowering parts respectively disposed in an outer periphery of a building to form a rectangle through enclosure, and comprising a tower crane body and a self-climbing lifting/lowering system that is capable of climbing or descending step by step along the tower crane body;

four tower-crane-body-connected support beams, respectively disposed on two opposite self-climbing lifting/lowering systems, wherein a hoisting platform enclosed by the tower-crane-body-connected support beams is driven by the self-climbing lifting/lowering systems to move up and down synchronously;

auxiliary moving beams, slidably disposed below two opposite tower-crane-body-connected support beams;

primary moving beams, located below the auxiliary moving beams and relatively perpendicular to the auxiliary moving beams, and slidably disposed below other two opposite tower-crane-body-connected support beams, wherein two ends thereof extend out of a frame enclosed by the four tower-crane-body-connected support beams, and lower ends thereof are slidably provided with hoisting trolleys;

four movable tower crane bases, respectively disposed at lower ends of the four tower crane body lifting/lowering parts, comprising movable chassis that are used as movable supports with a variable platform angle and support parts disposed on the movable chassis, wherein four corners of the support parts are respectively provided with rotary drilling fastening parts;

lower ends of the auxiliary moving beams and upper ends of the primary moving beams are connected through moving beam connecting mechanisms, and the auxiliary moving beams are controlled by the moving beam connecting mechanisms to drive the primary moving beams to move along axes of the primary moving beams;

the movable chassis comprises a crawler walking part and a variable angle system, and the crawler walking part comprises crawler power systems and a lifting oil cylinder between the crawler power systems;

the variable angle system comprises a variable angle system bottom plate disposed at an upper end of the lifting oil cylinder, a plurality of variable angle oil cylinders that are uniformly distributed at an upper end of the variable angle system bottom plate, and a variable angle system bearing steel plate disposed at an upper end of the variable angle oil cylinder, and is located between the plurality of variable angle oil cylinders, and a main bearing oil cylinder is disposed between the variable angle system bottom plate and the variable angle system bearing steel plate;

the main bearing oil cylinder comprises a main support frame that is centrally disposed on the variable angle system bottom plate, an inclined support plate is provided around an upper part of the main support frame, and a lower end of the inclined support plate is fastened at the center of four sides of the variable angle system bottom plate;

an upper end of the main support frame is provided with a main support servo-hydraulic cylinder, a cylinder body of the main support servo-hydraulic cylinder is located inside the main support frame, and a telescopic end of the main support servo-hydraulic cylinder is located above the main support frame; and a head of the telescopic end of the main support servo-hydraulic cylinder is provided with a Y-shaped pin head, and the Y-shaped pin head is fastened at a lower end of the variable angle system bearing steel plate.

* * * * *